United States Patent
Takamori et al.

(10) Patent No.: US 8,284,992 B2
(45) Date of Patent: Oct. 9, 2012

(54) MONITORING SYSTEM, MONITORING METHOD AND PROGRAM

(75) Inventors: Tetsuya Takamori, Kanagawa (JP); Makoto Yonaha, Kanagawa (JP); Yukinori Noguchi, Kanagawa (JP); Takayuki Udagawa, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 718 days.

(21) Appl. No.: 12/486,433

(22) Filed: Jun. 17, 2009

(65) Prior Publication Data
US 2009/0263021 A1 Oct. 22, 2009

Related U.S. Application Data

(63) Continuation of application No. PCT/JP2007/074773, filed on Dec. 18, 2007.

(30) Foreign Application Priority Data

Dec. 18, 2006 (JP) ................. 2006-340532
Dec. 25, 2006 (JP) ................. 2006-347075
Dec. 10, 2007 (JP) ................. 2007-318977

(51) Int. Cl.
*G06K 9/00* (2006.01)
(52) U.S. Cl. ........ 382/103; 348/143; 348/152; 348/153; 348/155; 348/169; 348/170; 348/171; 348/172; 348/208.14; 348/208.11; 375/240
(58) Field of Classification Search .................. 382/103, 382/232, 237; 348/152, 153, 143, 155, 169, 348/170, 171, 172, 208.14, 208.16; 375/240.01
See application file for complete search history.

(56) References Cited

U.S. PATENT DOCUMENTS
4,979,029 A 12/1990 Lemelson
(Continued)

FOREIGN PATENT DOCUMENTS
GB 2 408 880 A 6/2005
(Continued)

OTHER PUBLICATIONS
Machine translation of JP20022335492, published on Nov. 22, 2002, pp. 1-17.*

(Continued)

*Primary Examiner* — Matthew Bella
*Assistant Examiner* — Julian Brooks
(74) *Attorney, Agent, or Firm* — Birch, Stewart, Kolasch & Birch, LLP

(57) ABSTRACT

In order to appropriately detect abnormalities for the purpose of surveillance with it being possible to prevent an unnecessary increase in data amount of the monitoring images, a monitoring system includes an image capturing section that captures a moving image of a monitored area, a variation reduced image generating section that generates a variation reduced image by reducing a temporal variation in an image, based on a plurality of moving-image making-up images included in the moving image captured by the image capturing section, a condition storing section that stores thereon a condition which is required to be satisfied by a variation reduced image which is generated by using a plurality of moving-image making-up images included in a moving image which is judged to show an abnormality, a satisfaction judging section that judges whether the variation reduced image generated by the variation reduced image generating section satisfies the condition, an output moving image generating section that, when the satisfaction judging section judges negatively, generates an output moving image which has a lower image quality than when the satisfaction judging section judges positively, based on the moving image captured by the image capturing section, and an output section that outputs the output moving image generated by the output moving image generating section.

20 Claims, 16 Drawing Sheets

U.S. PATENT DOCUMENTS

| | | | |
|---|---|---|---|
| 6,011,901 A * | 1/2000 | Kirsten | 386/226 |
| 6,445,409 B1 | 9/2002 | Ito et al. | |
| 6,462,773 B1 | 10/2002 | Koga | |
| 6,961,447 B2 * | 11/2005 | Onuma et al. | 382/103 |
| 7,623,152 B1 * | 11/2009 | Kaplinsky | 348/208.16 |
| 2003/0107648 A1 * | 6/2003 | Stewart et al. | 348/143 |
| 2004/0208379 A1 * | 10/2004 | Kodama et al. | 382/232 |
| 2004/0233282 A1 * | 11/2004 | Stavely et al. | 348/143 |
| 2005/0018049 A1 | 1/2005 | Falk | |
| 2005/0138569 A1 * | 6/2005 | Baxter et al. | 715/788 |
| 2006/0012681 A1 | 1/2006 | Fujii | |
| 2006/0203903 A1 * | 9/2006 | Shih et al. | 375/240.01 |

FOREIGN PATENT DOCUMENTS

| | | |
|---|---|---|
| JP | 11-39495 A | 2/1999 |
| JP | 11-308601 A | 11/1999 |
| JP | 2000-105835 A | 4/2000 |
| JP | 2002-135759 A | 5/2002 |
| JP | 2002-335492 A | 11/2002 |
| JP | 2004-200989 A | 7/2004 |
| JP | 2006-33224 A | 2/2006 |
| JP | 2006-262433 A | 9/2006 |

OTHER PUBLICATIONS

European Search Report, Oct. 8, 2010.

Liu, Tsann-Shyong, "An Adaptive Temporal-Spatial Filter for MPEG Decoded Video Signals", pp. 251-262, 1995.

* cited by examiner

| SPEED OF MOVEMENT \ AREA OCCUPIED BY PERSON | S < S1 | S1 ≦ S < S2 | S2 ≦ S < S3 | S3 ≦ S |
|---|---|---|---|---|
| V < V1 | NOT TRANSMITTED | PR3 FR1 | PR2 FR1 | PR1 FR1 |
| V1 ≦ V < V2 | PR4 FR2 | PR3 FR2 | PR2 FR2 | PR1 FR2 |
| V2 ≦ V < V3 | PR4 FR3 | PR3 FR3 | PR2 FR3 | PR1 FR3 |
| V3 ≦ V | PR4 FR4 | PR3 FR4 | PR2 FR4 | PR1 FR4 |

262

RESOLUTION PR: PR4 > PR3 > PR2 > PR1
DISPLAY RATE FR: FR4 > FR3 > FR2 > FR1

*FIG. 5*

| | AREA OCCUPIED BY PERSON | SPEED OF MOVEMENT | AREA OF CHANGED REGION | AREA OCCUPIED BY PARTICULAR COLORS | COINCIDENCE IN TERMS OF SHAPE | COINCIDENCE IN TERMS OF DIRECTION |
|---|---|---|---|---|---|---|
| LOWER LIMIT VALUE | S1 | V1 | Sα | Sβ | sγ | md |

MONITORING SYSTEM, MONITORING METHOD AND PROGRAM

CROSS REFERENCE TO RELATED APPLICATION

This application is a continuation of PCT/JP2007/074773 filed on Dec. 18, 2007, and claims priority under 35 U.S.C. §119(a) on Patent Application Nos. 2006-340532, 2006-347075, and 2007-318977 filed in Japan on Dec. 18, 2006, Dec. 25, 2006, and Dec. 10, 2007, respectively, all of which are hereby expressly incorporated by reference into the present application.

BACKGROUND

1. Technical Field

The present invention relates to a monitoring system, a monitoring method, and a program. More particularly the present invention relates to a monitoring system and a monitoring method for realizing surveillance by way of images, and a program for use with a monitoring system.

2. Description of the Related Art

According to a known image capturing apparatus, a moving image compressing section detects a motion vector. During a period in which the detected motion vector indicates a value less than a predetermined value, the image capturing apparatus decreases the frame rate for the image capturing performed by an image capturing section by designating a relatively long time period as the period of the synchronous signal supplied to the image capturing section. On the other hand, during a period in which the detected motion vector indicates a value equal to or higher than the predetermined value, the image capturing apparatus increases the frame rate for the image capturing by designating a relatively short time period as the period of the synchronous signal. See Patent Document 1, for example. In this image capturing apparatus, the resolution set for the image capturing performed by the image capturing section is lowered during the period in which the motion vector indicates a value less than the predetermined value.

[Patent Document 1] Unexamined Japanese Patent Application Publication No. 2004-200989

According to the disclosure of Patent Document 1, when not detecting a movement represented by the predetermined value or higher in images it is capturing, the image capturing apparatus captures images of a low resolution at a low frame rate. Here, these lower-resolution images may make it difficult to determine whether a person who appears in the images is suspicious or not. However, if the image capturing apparatus captures and outputs high-resolution images, the data amount of the images increases. In this case, the image capturing apparatus requires a larger storage or transmission capacity. There are different problems. The image capturing apparatus may be fixed to, for example, a ceiling. Here, a short-cycle slight tremble of the ceiling may cause the image capturing apparatus to mistakenly detect that there is a movement in the monitored area even when there is nobody moving in the monitored area. Apart from this, if the frame rate for the image capturing is increased to such a point that the image capturing apparatus can detect a quick suspicious behavior, the image capturing apparatus may even detect a slow movement which does not need to be monitored. As stated, the increase in the frame rate for the image capturing is unnecessary. Therefore, the increase in the data amount of the captured moving images may be more than necessary.

SUMMARY

In view of this, the object of the present invention is to provide a monitoring system, a monitoring method and a program which are capable of solving the above-mentioned problems. This object is achieved by combining the features recited in the independent claims. The dependent claims define further effective specific example of the present invention.

To solve the above-mentioned problem, a first embodiment of the present invention provides a monitoring system including an image capturing section that captures a moving image of a monitored area, a variation reduced image generating section that generates a variation reduced image by reducing a temporal variation in an image, based on a plurality of moving-image making-up images included in the moving image captured by the image capturing section, a condition storing section that stores thereon a condition which is required to be satisfied by a variation reduced image which is generated by using a plurality of moving-image making-up images included in a moving image which is judged to show an abnormality, a satisfaction judging section that judges whether the variation reduced image generated by the variation reduced image generating section satisfies the condition, an output moving image generating section that, when the satisfaction judging section judges negatively, generates an output moving image which has a lower image quality than when the satisfaction judging section judges positively, based on the moving image captured by the image capturing section, and an output section that outputs the output moving image generated by the output moving image generating section.

The variation reduced image generating section may generate the variation reduced image by averaging a plurality of moving-image making-up images included in the moving image captured by the image capturing section. When the satisfaction judging section judges negatively, the output moving image generating section may generate an output moving image including the variation reduced image generated by the variation reduced image generating section, and when the satisfaction judging section judges positively, the output moving image generating section may use the moving image captured by the image capturing section as an output moving image.

A second embodiment of the present invention provides a monitoring method including capturing a moving image of a monitored area, generating a variation reduced image by reducing a temporal variation in an image, based on a plurality of moving-image making-up images included in the moving image captured in the image capturing, storing a condition which is required to be satisfied by a variation reduced image which is generated by using a plurality of moving-image making-up images included in a moving image which is judged to show an abnormality, judging whether the variation reduced image generated in the variation reduced image generating satisfies the condition, when the variation reduced image is judged not to satisfy the condition in the judging, generating an output moving image which has a lower image quality than when the variation reduced image is judged to satisfy the condition in the judging, based on the moving image captured in the image capturing, and outputting the output moving image generated in the output moving image generating.

A third embodiment of the present invention provides a program for use with a monitoring system. The program causes the monitoring system to function as an image capturing section that captures a moving image of a monitored area, a variation reduced image generating section that generates a variation reduced image by reducing a temporal variation in an image, based on a plurality of moving-image making-up images included in the moving image captured by the image capturing section, a condition storing section that stores thereon a condition which is required to be satisfied by a variation reduced image which is generated by using a plurality of moving-image making-up images included in a moving image which is judged to show an abnormality, a satisfaction judging section that judges whether the variation reduced image generated by the variation reduced image generating section satisfies the condition, an output moving image generating section that, when the satisfaction judging section judges negatively, generates an output moving image which has a lower image quality than when the satisfaction judging section judges positively, based on the moving image captured by the image capturing section, and an output section that outputs the output moving image generated by the output moving image generating section.

Here, all the necessary features of the present invention are not listed in the summary. The sub-combinations of the features may become the invention.

The present invention is capable of providing a monitoring system which can appropriately detect abnormalities for the purpose of surveillance with it being possible to prevent an unnecessary increase in data amount of the monitoring images.

BRIEF DESCRIPTION OF THE DRAWINGS

FIG. 5 illustrates an example of image quality information stored on an image quality storing section 262.

FIG. 12 illustrates, as an example, conditions stored on a condition storing section 240.

DESCRIPTION OF EXEMPLARY EMBODIMENTS

Hereinafter, an embodiment of the present invention will be described. The embodiment does not limit the invention according to the claims, and all the combinations of the features described in the embodiment are not necessarily essential to means provided by aspects of the invention.

Figure 1:
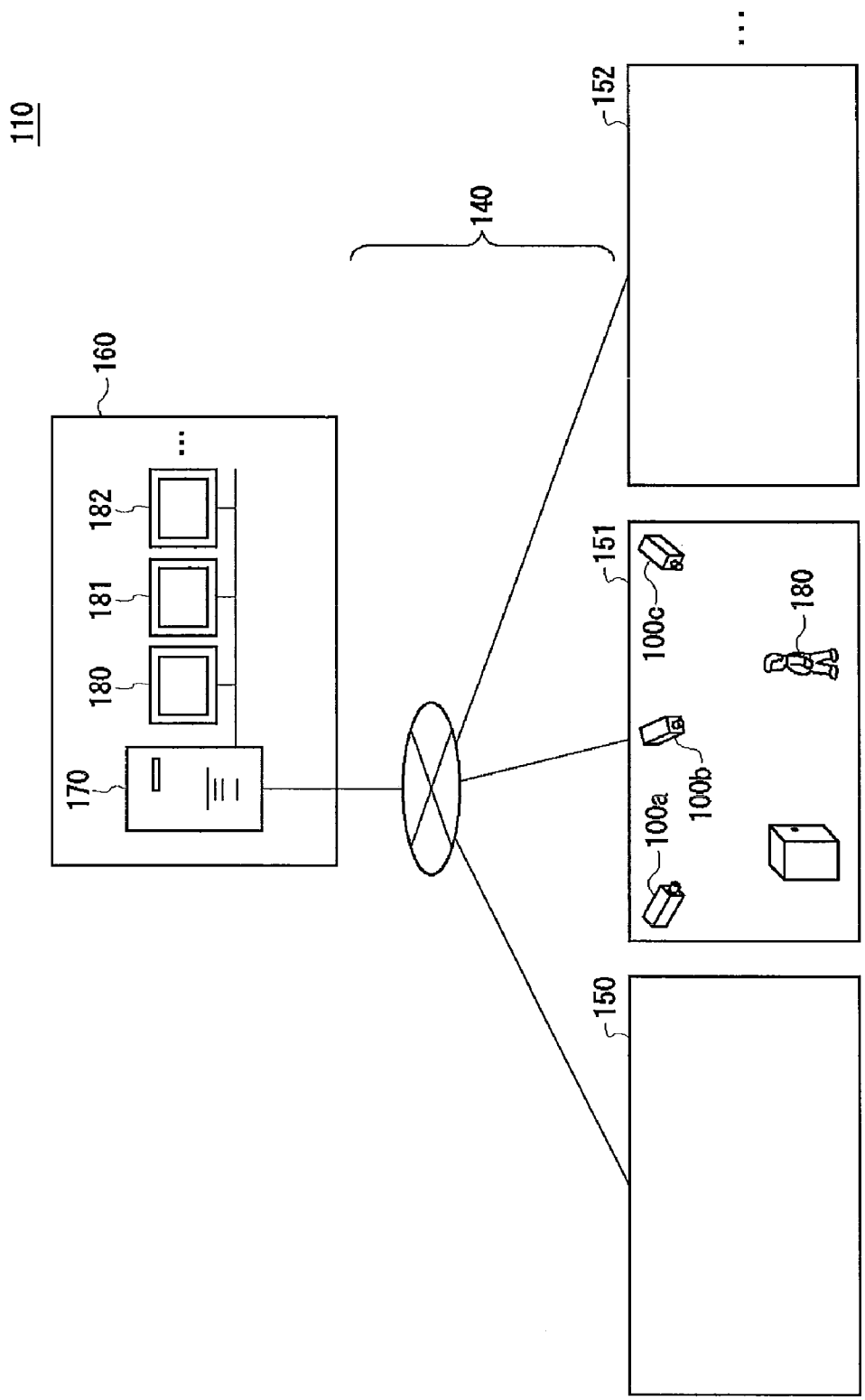
FIG. 1 illustrates an exemplary environment in which a monitoring system 110 is used.

FIG. 1 illustrates an exemplary environment in which a monitoring system 110 relating to an embodiment is used. The monitoring system 110 includes therein a plurality of image capturing apparatuses 100a to 100c, a transmission path 140, a server 170, and a plurality of display apparatuses 180, 181, 182, . . . . The server 170 and plurality of display apparatases 180, 181, 182, . . . are provided in a monitoring room 160 distant from monitored areas 150, 151, 152, . . . . Here, the set of image capturing apparatuses 100a to 100c is provided in each of the plurality of monitored areas 150, 151, 152, . . . to capture the images of a corresponding one of the plurality of monitored areas 150, 151, 152, . . . . Hereinafter, the set of image capturing apparatuses 100a to 100c provided in each of the plurality of monitored areas 150, 151, 152, . . . is collectively referred to as the image capturing apparatuses 100.

The image capturing apparatuses 100 capture the moving images of the monitored areas 150, 151, 152, . . . and transmit the captured moving images to the server 170 via the transmission path 140. The server 170 receives the moving images from the image capturing apparatuses 100, and causes the display apparatuses 180, 181, 182, . . . to display the received moving images thereon. The display apparatuses 180, 181, 182, . . . respectively display thereon the moving images of the monitored areas 150, 151, 152, . . . .

Here, the image capturing apparatuses 100 capture frame images which have a resolution higher than the monitor resolution at which the display apparatuses 180, 181, 182, . . . can display frame images. Also, the image capturing apparatuses 100 capture moving images at a frame rate higher than the monitor display rate at which the display apparatuses 180, 181, 182, . . . can display moving images. During a period in which no person or change is detected in a moving image captured, each image capturing apparatus 100 captures a moving image, converts the captured moving image into a moving image in which frame images of a resolution equal to or lower than the monitor resolution are displayed at a rate equal to or lower than the monitor display rate, and continues to transmit the moving image obtained by the conversion to the server 170.

When detecting a person or change in the moving image captured, the image capturing apparatus 100 starts and continues to transmit, to the server 170, the captured moving image with a high resolution and a high frame rate until such a time point that the image capturing apparatus 100 no longer detects a person or change in the moving image. The server 170 records thereon the moving image received from the image capturing apparatus 100, and causes a corresponding one of the display apparatuses 180, 181, 182, . . . to display thereon the received moving image in such a manner as to conform to the monitor resolution and monitor display rate.

For example, the image capturing apparatus 100 temporally averages a plurality of captured frame images so as to obtain an averaged image, and detects a change by using the obtained averaged image or detects a person in the averaged image. For example, the image capturing apparatus 100 determines that a change is detected in the moving image when detecting a change between temporally successive averaged images in a region thereof having an area equal to or larger than a predetermined threshold value. When detecting a person or change in the moving image, the image capturing apparatus 100 generates frame images which have, at least in the region in which the person or change is detected, the original resolution at the time of the image capturing, and transmits a moving image including the generated frame images to the server 170. When detecting a movement of a person, the image capturing apparatus 100 generates frame images which have, at least in a region in which a section ahead of the person in terms of the moving direction is adjusted to be larger, the original resolution at the time of the image capturing, and transmits a moving image including the generated frame images to the server 170.

The image capturing apparatus 100 may transmit, to the server 170, a moving image which is made up by frame images showing the region in which the person or change is detected. If this is the case, the image capturing apparatus 100 stores thereon the partial images showing the region other than the region in which the person or change is detected. Here, as mentioned above, the image capturing apparatus 100 starts to transmit, to the server 170, frame images with a lowered image quality once the person or change becomes no longer detected. Therefore, the amount of data transmitted via the transmission path 140 decreases once the person or change becomes no longer detected. Considering this, the image capturing apparatus 100 may transmit to the server 170 the partial images which have been stored thereon once the person or change becomes no longer detected.

The server 170 causes the image capturing apparatus 100 to increase the threshold value as the difference between the amount of data which can be transmitted per unit time via the transmission path 140 and the amount of data which is transmitted per unit time from the image capturing apparatus 100 decreases. Such a configuration can prevent the amount of data transmitted via the transmission path 140 from increasing, thereby preventing the moving image data from arriving late.

The monitored areas 150, 151, 152, . . . may be respectively spaces within different buildings or different spaces within the same building. For example, the monitored areas 150, 151, 152, . . . may be aisles between the shelves in a shop. The monitored areas 150, 151, 152, . . . are not limited to the spaces within one or more buildings, but may be open spaces which are not enclosed.

Figure 2:
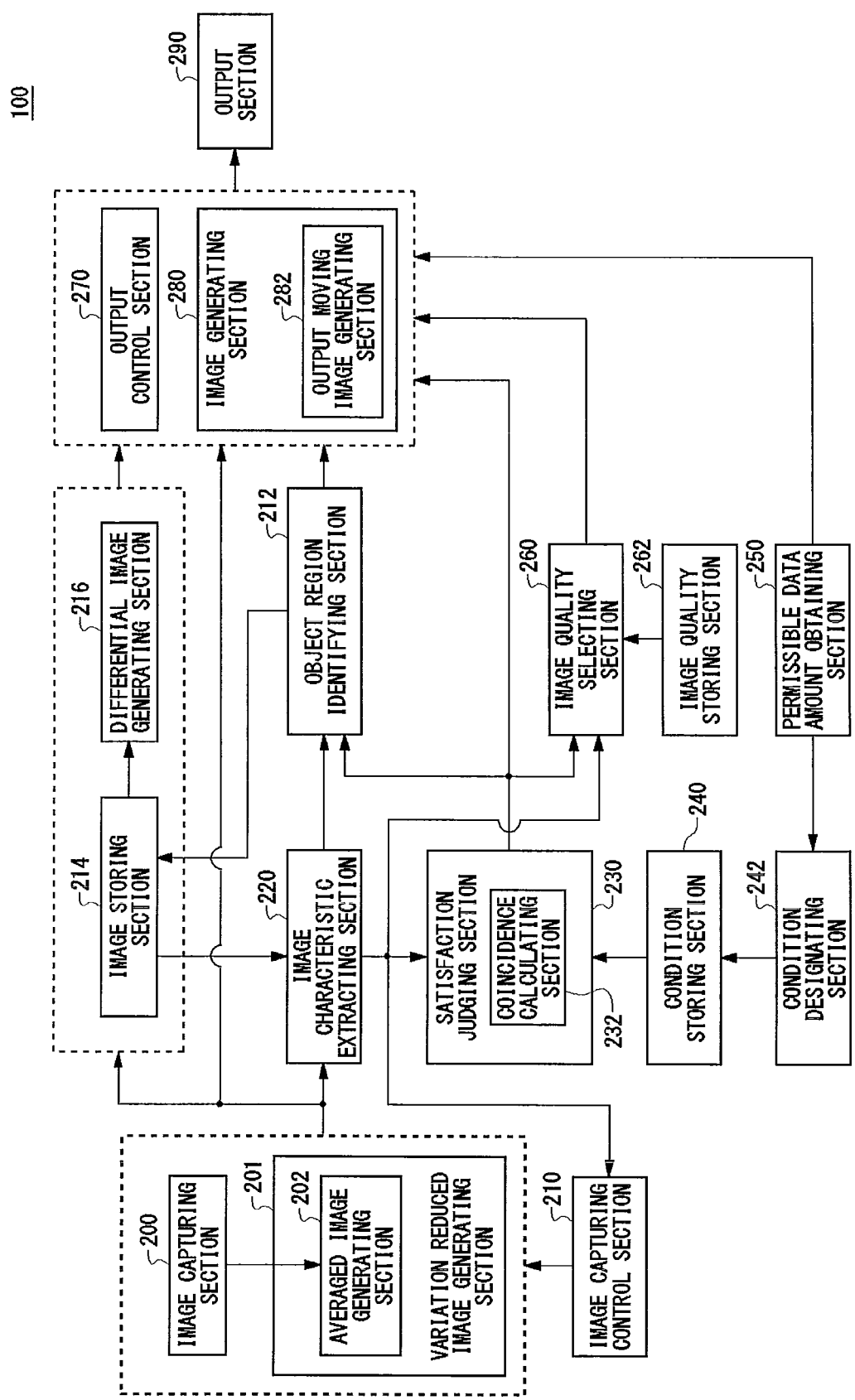
FIG. 2 illustrates an exemplary block configuration of an image capturing apparatus 100.
Figure 3:
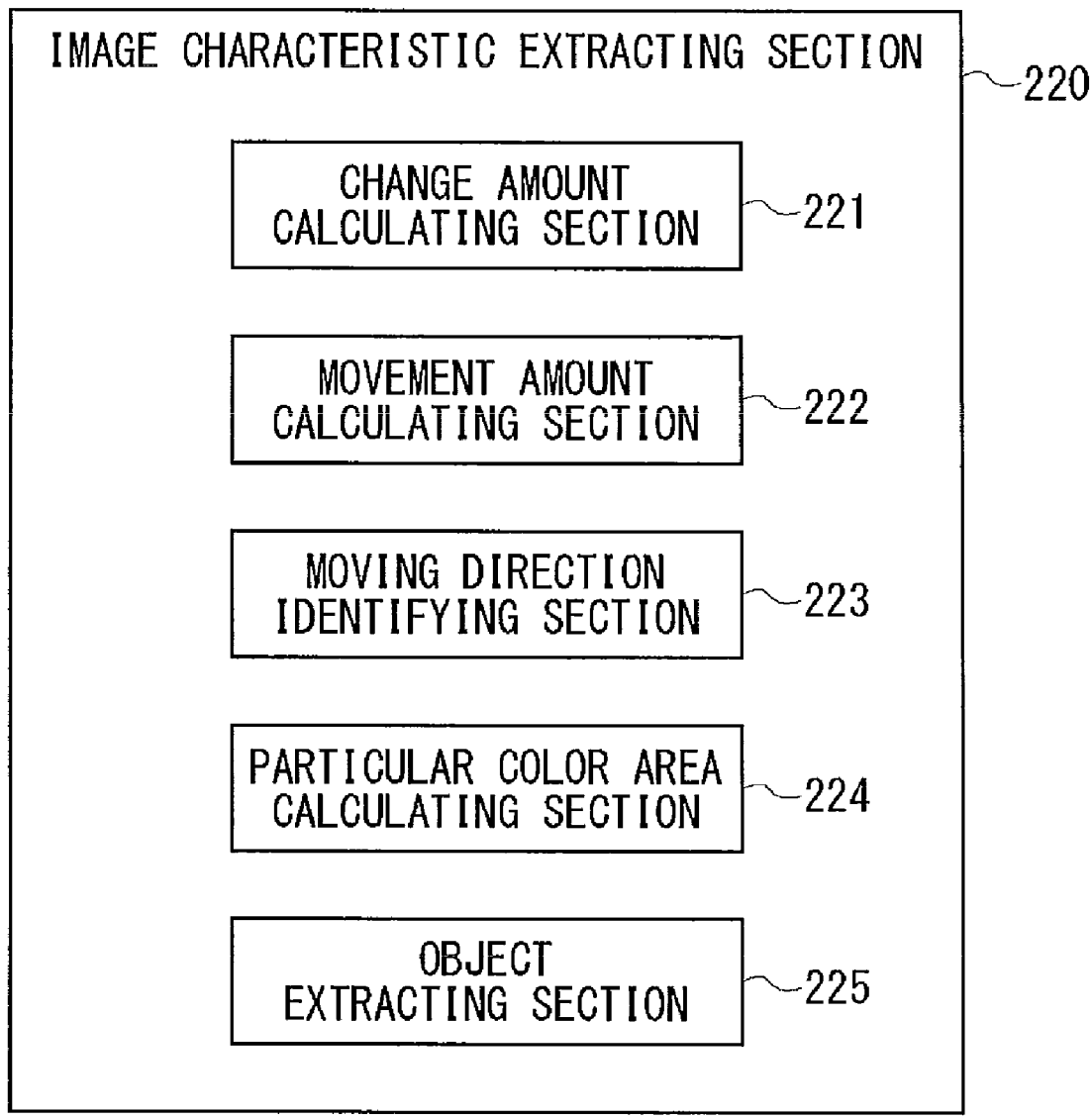
FIG. 3 illustrates an exemplary block configuration of an image characteristic extracting section 220.

FIG. 2 illustrates an exemplary block configuration of the image capturing apparatus 100. The image capturing apparatus 100 includes therein an image capturing section 200, a variation reduced image generating section 201, an image capturing control section 210, an object region identifying section 212, an image storing section 214, a differential image generating section 216, an image characteristic extracting section 220, a satisfaction judging section 230, a condition storing section 240, a condition designating section 242, a permissible data amount obtaining section 250, an image quality selecting section 260, an image quality storing section 262, an output control section 270, an image generating section 280, and an output section 290. The satisfaction judging section 230 includes therein a match calculating section 232. The image generating section 280 includes therein an output moving image generating section 282. FIG. 3 illustrates an exemplary block configuration of the image characteristic extracting section 220. The image characteristic extracting section 220 includes therein a change amount calculating section 221, a movement amount calculating section 222, a moving direction identifying section 223, a particular color area calculating section 224, and an object extracting section 225. The variation reduced image generating section 201 includes therein an averaged image generating section 202.

The image capturing section 200 captures an image of a monitored area. Specifically speaking, the image capturing section 200 captures a moving image of the monitored area. The variation reduced image generating section 201 generates a variation reduced image by reducing a temporal variation in an image, based on a plurality of moving-image making-up images included in the moving image captured by the image capturing section 200. To be specific, the averaged image generating section 202 generates an averaged image by averaging a plurality of moving-image making-up images included in the moving image captured by the image capturing section 200. For example, the averaged image generating section 202 generates an averaged image by averaging, in units of a pixel a plurality of moving-image making-up images. Note that the averaged image may be referred to only as an example of a variation reduced image relating to the present invention. As another example, the variation reduced image may be an image generated by selecting, in units of a pixel a median or largest value among the pixel values of the plurality of moving-image making-up images. As a further different example, the variation reduced image may be an image generated by adding, in units of a pixel, the pixel values of the plurality of moving-image making-up images (an overlap image).

The condition storing section 240 stores thereon a condition which is required to be satisfied by a variation reduced image that is generated by using a plurality of moving-image making-up images included in a moving image. To be specific, the condition storing section 240 stores thereon a condition which is required to be satisfied by a variation reduced image that is generated by using a plurality of moving-image making-up images included in a moving image satisfying a predetermined condition. For example, the condition storing section 240 stores thereon a condition used to judge whether abnormalities are present in the monitored region. Therefore, the condition storing section 240 stores thereon a condition which is required to be satisfied by a variation reduced image that is generated based on a plurality of moving-image making-up images included in a moving image that is judged to show abnormalities. To be specific, the condition storing section 240 stores thereon a condition which is required to be satisfied by an averaged image which is generated by averaging a plurality of moving-image making-up images included in a moving image that is judged to show abnormalities.

The following introduces some examples of the moving image that is judged to show abnormalities. Such abnormal moving images include a moving image in which a person is captured, a moving image in which the face of a person is captured, a moving image in which a predetermined person is captured, a moving image in which a person other than a predetermined person is captured, a moving image in which a physical object having a predetermined shape is captured, a moving image in which a predetermined physical object is taken away, a moving image in which a predetermined phenomenon such as flame and smoke is captured, a moving image in which a moving physical object is captured, a moving image in which a physical object moving in a predetermined direction is captured, a moving image in which a physical object moving at a speed higher than a predetermined value is captured, a moving image in which a moving physical object with a speed varying amount higher than a predetermined value is captured, a moving image in which people or physical objects collide with each other at a predetermined speed or higher, a moving image in which a person or physical object enters into a predetermined position, a moving image in which a person or physical object stays at a predetermined position for a predetermined time period or longer, and a moving image in which no physical objects are captured. Therefore, when the variation reduced image generated based on the moving image of the monitored area satisfies the condition stored on the condition storing section 240, it can be judged that abnormalities are present in the monitored region.

The satisfaction judging section 230 judges whether the variation reduced image generated by the variation reduced image generating section 201 satisfies a predetermined condition. For example, the satisfaction judging section 230 judges whether the variation reduced image generated by the variation reduced image generating section 201 satisfies the condition. To be specific, the satisfaction judging section 230 judges whether the averaged image generated by the averaged image generating section 202 satisfies the condition. When the satisfaction judging section 230 judges that the variation reduced image does not satisfy the condition, the output moving image generating section 282 generates, based on the moving image captured by the image capturing section 200, an output moving image having a lower image quality than when the satisfaction judging section 230 judges that the variation reduced image satisfies the condition. To be specific, when the satisfaction judging section 230 judges that the averaged image does not satisfy the condition, the output moving image generating section 282 generates an output moving image by using the moving-image making-up images included in the moving image captured by the image capturing section 200. The generated output moving image includes moving-image making-up images which have a lower image quality than when the satisfaction judging section 230 judges that the averaged image satisfies the condition.

The output section 290 outputs the output moving image generated by the output moving image generating section 282. For example, the output section 290 outputs the output moving image generated by the output moving image generating section 282 to the transmission path 140 which is provided to transmit moving images of monitored areas which are captured by a plurality of image capturing sections 200. Alternatively, the output section 290 may output the moving image of the monitored area which is captured by the image capturing section 200. For example, the output section 290 may output the moving image captured by the image capturing section 200 when the satisfaction judging section 230 judges that the averaged image satisfies the condition.

The variation reduced image generating section 201 may generate the variation reduced image based on a predetermined number of moving-image making-up images included in the moving image captured by the image capturing section 200. When the satisfaction judging section 230 judges that the variation reduced image does not satisfy the condition, the output moving image generating section 282 may generate, based on the moving image captured by the image capturing section 200, an output moving image which has a lower image quality during at least part of a period in which the predetermined number of moving-image making-up images are captured, than when the satisfaction judging section 230 judges that the variation reduced image satisfies the condition.

Specifically speaking, when the satisfaction judging section 230 judges that the variation reduced image does not satisfy the condition, the output moving image generating section 282 generates an output moving image including moving-image making-up images having a lower resolution than when the satisfaction judging section 230 judges that the variation reduced image satisfies the condition. To be specific, when the satisfaction judging section 230 judges that the averaged image does not satisfy the condition, the output moving image generating section 282 generates an output moving image including moving-image making-up images which have a lower resolution than when the satisfaction judging section 230 judges that the averaged image satisfies the condition. Alternatively, when the satisfaction judging section 230 judges that the variation reduced image does not satisfy the condition, the output moving image generating section 282 may generate an output moving image including moving-image making-up images which are expressed by using a smaller number of gray levels than when the satisfaction judging section 230 judges that the variation reduced image satisfies the condition. To be specific, when the satisfaction judging section 230 judges that the averaged image does not satisfy the condition, the output moving image generating section 282 may generate an output moving image including a moving-image making-up images which are expressed by using a smaller number of gray levels than when the satisfaction judging section 230 judges that the averaged image satisfies the condition.

As a further alternative example, when the satisfaction judging section 230 judges that the variation reduced image does not satisfy the condition, the output moving image generating section 282 may generate, by using the moving image captured by the image capturing section 200, an output moving image which has a lower display rate than when the satisfaction judging section 230 judges that the variation reduced image satisfies the condition. To be specific, when the satisfaction judging section 230 judges that the averaged image does not satisfy the condition, the output moving image generating section 282 may generate, by using the moving image captured by the image capturing section 200, an output moving image which has a lower display rate than when the satisfaction judging section 230 judges that the averaged image satisfies the condition.

When the satisfaction judging section 230 judges that the variation reduced image does not satisfy the condition, the output moving image generating section 282 may generate an output moving image including variation reduced images generated by the variation reduced image generating section 201. When the satisfaction judging section 230 judges that the variation reduced image satisfies the condition, the output moving image generating section 282 may use the moving image captured by the image capturing section 200 as an output moving image. To be specific, when the satisfaction judging section 230 judges that the averaged image does not satisfy the condition, the output moving image generating section 282 may generate an output moving image including averaged images generated by the averaged image generating section 202. When the satisfaction judging section 230 judges that the averaged image satisfies the condition, the output moving image generating section 282 may use the moving image captured by the image capturing section 200 as the output moving image.

The differential image generating section 216 generates a differential image between a first variation reduced image and a second variation reduced image which are both generated by the variation reduced image generating section 201. Here, the second variation reduced image is generated by using moving-image making-up images which are captured after any of the moving-image making-up images used to generate the first variation reduced image. To be specific, the differential image generating section 216 generates a differential image between a first averaged image and a second averaged image which are both generated by the averaged image generating section 202. It should be noted here that the second averaged image is generated by using moving-image making-up images which are captured after any of the moving-image making-up images which are used for generating the first averaged image. When the satisfaction judging section 230 judges that the variation reduced image does not satisfy the condition, the output moving image generating section 282 generates an output moving image including differential images generated by the differential image generating section 216. When the satisfaction judging section 230 judges that the variation reduced image satisfies the condition, the output moving image generating section 282 uses the moving image captured by the image capturing section 200 as an output moving image. To be specific, when the satisfaction judging section 230 judges that the averaged image does not satisfy the condition, the output moving image generating section 282 may generate an output moving image including differential images generated by the differential image generating section 216. When the satisfaction judging section 230 judges that the averaged image satisfies the condition, the output moving image generating section 282 may use the moving image captured by the image capturing section 200 as the output moving image.

The permissible data amount obtaining section 250 obtains the data amount per unit time which is permitted to be output from the output section 290. For example, the permissible data amount obtaining section 250 may obtain the amount of data which can be transmitted per unit time via the transmission path 140, or the amount of data which an output control device 172 can process per unit time. When the satisfaction judging section 230 judges that the variation reduced image does not satisfy the condition, the output moving image generating section 282 generates the output moving image including the differential images generated by the differential image generating section 216 under the condition that the data amount obtained by the permissible data amount obtaining section 250 is smaller than a predetermined value. To be specific, when the satisfaction judging section 230 judges that the averaged image does not satisfy the condition, the output moving image generating section 282 generates an output moving image including differential images generated by the differential image generating section 216 under the condition that the data amount which is obtained by the permissible data amount obtaining section 250 is smaller than a predetermined value.

Here, the satisfaction judging section 230 may judge whether each of the partial regions in the variation reduced image satisfies the condition. To be specific, the satisfaction judging section 230 may judge whether each of the partial regions in the averaged image satisfies the condition. The output moving image generating section 282 may generate an output moving image in which the image quality is lower in a region which is different from a satisfying region that is judged by the satisfaction judging section 230 to satisfy the condition than in the satisfying region. To be specific, the output moving image generating section 282 may generate an output moving image including moving-image making-up images in which the image quality is lower in a region which is not a satisfying region that is judged by the satisfaction judging section 230 to satisfy the condition than in the satisfying region.

The object extracting section 225 extracts an object from the variation reduced image generated by the variation reduced image generating section 201. To be specific, the object extracting section 225 extracts an object which satisfies a predetermined condition from the moving image captured by the image capturing section 200. Specifically speaking, the object extracting section 225 extracts an object which satisfies the condition stored on the condition storing section 240, from the moving-image making-up images included in the moving image captured by the image capturing section 200. The image quality of the moving image obtained by the conversion performed by the image generating section 280 on the moving image captured by the image capturing section 200 decreases as the size of the object extracted by the object extracting section 225 increases. The output section 290 outputs the moving image obtained by the conversion performed by the image generating section 280. In this case, the resolution of the moving image obtained by the conversion performed by the image generating section 280 on the moving image captured by the image capturing section 200 decreases as the size of the object extracted by the object extracting section 225 increases.

The movement amount calculating section 222 calculates the amount of the movement made by the object extract by the object extracting section 225 between the moving-image making-up images included in the moving image captured by the image capturing section 200. The condition storing section 240 stores thereon a lower limit value for the amount of a movement which is required to be made by an object required to be extracted. For example, the condition storing section 240 stores thereon a lower limit value for the amount of a movement, between successive frames, which is required to be made by the object required to be extracted. The object extracting section 225 extracts, from the moving-image making-up images included in the moving image captured by the image capturing section 200, an object which makes a movement the amount of which is calculated by the movement amount calculating section 222 and is equal to or higher than the lower limit value for the amount of the movement which is stored on the condition storing section 240. Here, the resolution of the moving image obtained by the conversion performed by the image generating section 280 on the moving image captured by the image capturing section 200 decreases as the size of the object extracted by the object extracting section 225 increases. To be specific, the display rate of the moving image obtained by the conversion performed by the image generating section 280 on the moving image captured by the image capturing section 200 decreases as the amount of the movement made by the object which is calculated by the movement amount calculating section 222 increases.

The image quality storing section 262 stores thereon, in association with the size of the object and the amount of the movement made by the object, combinations of the display rate of a moving image and the image quality of the moving-image making-up images included in the moving image. The image quality selecting section 260 selects a combination of the image quality and display rate which is stored on the image quality storing section 262 in association with the size of the object extracted by the object extracting section 225 and the amount of the movement made by the object which is calculated by the movement amount calculating section 222. The image generating section 280 converts the moving image captured by the image capturing section 200 into a moving image in which moving-image making-up images having the image quality selected by the image quality selecting section 260 are displayed at the display rate selected by the image quality selecting section 260.

The moving direction identifying section 223 identifies the direction in which the object extracted by the object extracting section 225 moves, based on what is shown by the moving image captured by the image capturing section 200. The image generating section 280 generates, by using the cropping technique and the moving-image making-up images included in the moving image captured by the image capturing section 200, moving-image making-up images each of which contains therein the object and the width of which is larger in the moving direction than in the direction vertical to the moving direction. The output section 290 outputs a moving image including the moving-image making-up images generated by the image generating section 280. The movement amount calculating section 222 calculates the amount of the movement made by the object, in the direction identified by the moving direction identifying section 223, between the moving-image making-up images included in the moving image captured by the image capturing section 200. The width, in the moving direction which is identified by the moving direction identifying section 223, of the moving-image making-up images generated by the image generating section 280 by using the cropping technique and the moving-image making-up images included in the moving image captured by the image capturing section 200 increases as the amount of the movement which is calculated by the movement amount calculating section 222 increases. Therefore, the image capturing apparatus 100 can provide a monitoring image which enables a user to appropriately monitor a region towards which a suspicious person moves, with it being possible to prevent an unnecessary increase in the amount of data transmitted via the transmission path 140.

The condition storing section 240 stores thereon a lower limit value for the amount of a change, from a reference image, which is required to be detected in moving-image making-up images included in a moving image which is judged to show abnormalities. The change amount calculating section 221 calculates the amount of a change, from a reference image, which is found in the variation reduced image generated by the variation reduced image generating section 201. To be specific, the change amount calculating section 221 calculates the amount of a change, from a predetermined reference image, which is found in the moving image captured by the image capturing section 200. For example, the change amount calculating section 221 calculates the amount of a change found in a first moving-image making-up image contained in the moving image captured by the image capturing section 200, from a second moving-image making-up image which is captured prior to the first moving-image making-up image. Note that the change amount calculating section 221 calculates the amount of a change, from the reference image, in the averaged image generated by the averaged image generating section 202. Here, the reference image may be an image of the monitored area which is provided in advance, a moving-image making-up image which is captured by the image capturing section 200 at a preceding timing, or an averaged image which is generated at a preceding timing.

The satisfaction judging section 230 judges that the variation reduced image satisfies the condition when the amount of the change which is calculated by the change amount calculating section 221 is equal to or higher than the lower limit value for the amount of the change which is stored on the condition storing section 240. To be specific, the satisfaction judging section 230 judges that the averaged image satisfies the condition when the amount of the change which is calculated by the change amount calculating section 221 is equal to or higher than the lower limit value for the amount of the change which is stored on the condition storing section 240.

When the amount of the change which is calculated by the change amount calculating section 221 is lower than a predetermined lower limit value for the amount of the change, the output control section 270 converts the moving image captured by the image capturing section 200 into a moving image which has a smaller amount of data than when the amount of the change which is calculated by the change amount calculating section 221 is equal to or higher than the lower limit value, and causes the output section 290 to output the moving image obtained by the conversion. To be specific, when the amount of the change from the reference image is smaller than the lower limit value, the output control section 270 converts the moving image captured by the image capturing section 200 into a moving image which has a lower resolution than when the amount of the change from the reference image is equal to or higher than the lower limit value, and causes the output section 290 to output the moving image obtained by the conversion. Alternatively, when the amount of the change from the reference image is lower than the lower limit value, the output control section 270 may convert the moving image captured by the image capturing section 200 into a moving image which is expressed by using a smaller number of gray levels than when the amount of the change from the reference image is equal to or higher than the lower limit value, and cause the output section 290 to output the moving image obtained by the conversion. As another alternative example, when the amount of the change from the reference image is smaller than the lower limit value, the output control section 270 converts the moving image captured by the image capturing section 200 into a moving image which has a lower display rate than when the amount of the change from the reference image is equal to or higher than the lower limit value, and causes the output section 290 to output the moving image obtained by the conversion. Here, the condition designating section 242 increases the lower limit value stored on the condition storing section 240 as the data amount obtained by the permissible data amount obtaining section 250 decreases.

The change amount calculating section 221 may calculate the amount of the movement made by the object which shows a given subject, between the first and second moving-image making-up images included in the moving image captured by the image capturing section 200. When the amount of the movement made by the object which is calculated by the change amount calculating section 221 is lower than a predetermined lower limit value for the amount of the movement, the output control section 270 converts the moving image captured by the image capturing section 200 into a moving image which has a smaller amount of data than when the amount of the movement which is calculated by the change amount calculating section 221 is equal to or higher than the lower limit value for the amount of the movement, and causes the output section 290 to output the moving image obtained by the conversion. Here, the condition designating section 242 may increase the lower limit value for the amount of the movement as the data amount obtained by the permissible data amount obtaining section 250 decreases.

The condition storing section 240 stores thereon a lower limit value for the degree of match which is required to be detected between a predetermined object and an object in a variation reduced image generated by using moving-image making-up images included in a moving image which is judged to show abnormalities. To be specific, the condition storing section 240 stores thereon a lower limit value for the degree of match which is required to be detected between a predetermined object and an object in an averaged image generated by averaging moving-image making-up images included in a moving image which is judged to show abnormalities. The object extracting section 225 extracts an object from the averaged image generated by the averaged image generating section 202.

When the degree of match between the object extracted by the object extracting section 225 and the predetermined object is equal to or higher than the lower limit value stored on the condition storing section 240, the satisfaction judging section 230 judges that the variation reduced image satisfies the condition. To be specific, when the degree of match between the object extracted by the object extracting section 225 and the predetermined object is equal to or higher than the lower limit value stored on the condition storing section 240, the satisfaction judging section 230 judges that the averaged image satisfies the condition. To be further specific, the match calculating section 232 calculates the degree of match between the shape of the object included in the moving image captured by the image capturing section 200 and the shape of a predetermined reference object. When the degree of match calculated by the match calculating section 232 is equal to or higher than the lower limit value stored on the condition storing section 240, the satisfaction judging section 230 judges that the averaged image satisfies the condition.

When the degree of match calculated by the match calculating section 232 is lower than a predetermined lower limit value for the degree of match, the output control section 270 may convert the moving image captured by the image capturing section 200 into a moving image which has a smaller amount of data than when the degree of match calculated by the match calculating section 232 is equal to or higher than the lower limit value, and cause the output section 290 to output the moving image obtained by the conversion. To be specific, when the degree of match calculated by the match calculating section 232 is lower than a predetermined lower limit value for the degree of match in terms of shape, the output control section 270 converts the moving image captured by the image capturing section 200 into a moving image which has a smaller amount of data than when the degree of match calculated by the match calculating section 232 is equal to or higher than the lower limit value for the degree of match in terms of shape, and causes the output section 290 to output the moving image obtained by the conversion. Here, the condition designating section 242 may increase the lower limit value for the degree of match in terms of shape as the data amount obtained by the permissible data amount obtaining section 250 decreases.

The condition storing section 240 stores thereon a lower limit value for the area occupied by colors included in a predetermined color range, which is required to be detected in a variation reduced image generated by using moving-image making-up images included in a moving image which is judged to show abnormalities. To be specific, the condition storing section 240 stores thereon a lower limit value for the area occupied by colors included in a predetermined color range, which is required to be detected in an averaged image generated by averaging moving-image making-up images included in a moving image which is judged to show abnormalities. For example, the condition storing section 240 may store thereon a lower limit value for the area occupied by colors included in a color range which has colors characteristic to a person. The particular color area calculating section 224 calculates the area occupied by the colors included in the predetermined color range, in the variation reduced image generated by the variation reduced image generating section 201. To be specific, the particular color area calculating section 224 calculates the area occupied by the colors included in the predetermined color range, in the averaged image generated by the averaged image generating section 202.

When the area calculated by the particular color area calculating section 224 is equal to or higher than the lower limit value for the area which is stored on the condition storing section 240, the satisfaction judging section 230 judges that the variation reduced image satisfies the condition. To be specific, when the area calculated by the particular color area calculating section 224 is equal to or higher than the lower limit value for the area which is stored on the condition storing section 240, the satisfaction judging section 230 judges that the averaged image satisfies the condition. To be further specific, the match calculating section 232 calculates the degree of match between the colors included in the object contained in the moving image captured by the image capturing section 200 and the colors included in a predetermined reference object. When the degree of match calculated by the match calculating section 232 is equal to or higher than the lower limit value stored on the condition storing section 240, the satisfaction judging section 230 judges that the averaged image satisfies the condition.

The condition storing section 240 stores thereon a lower limit value for the degree of match which is required to be detected in a variation reduced image which is generated by using moving-image making-up images included in a moving image which is judged to show abnormalities, between the direction from the position of the subject contained in the variation reduced image to the image capturing section 200 and the direction in which the subject moves. To be specific, the condition storing section 240 stores thereon a lower limit value for the degree of match which is required to be detected in an averaged image generated by averaging moving-image making-up images included in a moving image which is judged to show abnormalities, between the direction from the position of the subject contained in the averaged image to the image capturing section 200 and the direction in which the subject moves.

The moving direction identifying section 223 identifies the direction in which the subject moves in the monitored area based on what is shown by a plurality of variation reduced images generated by the variation reduced image generating section 201. To be specific, the moving direction identifying section 223 identifies the direction in which the subject moves in the monitored area based on what is shown by a plurality of averaged images generated by the averaged image generating section 202. When the degree of match between the direction in which the subject moves and the direction from the position of the subject to the image capturing section 200 is equal to or higher than the lower limit value for the degree of match which is stored on the condition storing section 240, the satisfaction judging section 230 judges that the variation reduced image satisfies the condition. To be specific, when the degree of match between the direction in which the subject moves and the direction from the position of the subject to the image capturing section 200 is equal to or higher than the lower limit value for the degree of match which is stored on the condition storing section 240, the satisfaction judging section 230 judges that the averaged image satisfies the condition.

When the satisfaction judging section 230 judges that there is an object satisfying the condition, the object region identifying section 212 identifies an object region including the object satisfying the condition. When the satisfaction judging section 230 judges that there is an object satisfying the condition, the output section 290 outputs the image of the object region. When the satisfaction judging section 230 judges that there is an object satisfying the condition, the image storing section 214 stores thereon the image of the region other than the object region. When the satisfaction judging section 230 judges that there is no object satisfying the condition in the moving image of the monitored area after the image storing section 214 stores thereon the image of the region other than the object region, the output control section 270 causes the output section 290 to output the image of the region other than the object region which is stored on the image storing section 214.

When the satisfaction judging section 230 judges that there is an object satisfying the condition, the image quality of the image of the object region which is output from the output section 290 may increase as the data amount obtained by the permissible data amount obtaining section 250 increases. When the satisfaction judging section 230 judges that there is an object satisfying the condition, the size of the object region including the object satisfying the condition which is identified by the object region identifying section 212 may increase as the data amount obtained by the permissible data amount obtaining section 250 increases.

When the satisfaction judging section 230 judges that there is no object satisfying the condition in the moving image of the monitored area after the image storing section 214 stores thereon the image of the region other than the object region, the output control section 270 causes the output section 290 to output the image of the region other than the object region which is stored on the image storing section 214 under the condition that the data amount which is obtained by the permissible data amount obtaining section 250 is higher than a predetermined value.

When the satisfaction judging section 230 judges that there is no object satisfying the condition in the moving image of the monitored area after the image storing section 214 stores thereon the image of the region other than the object region, the output control section 270 may cause the output section 290 to output the image of the region other than the object region which is stored on the image storing section 214, with the image quality corresponding to the data amount which is obtained by the permissible data amount obtaining section 250.

The object region identifying section 212 may identify, as the object region, a region including an object which makes a movement, between a plurality of moving-image making-up images included in the moving image captured by the image capturing section 200, the amount of which is equal to or higher than the lower limit value for the amount of the movement which is stored on the condition storing section 240.

The condition storing section 240 may store thereon a lower limit value for the degree of match between an object which is required to be extracted from a moving image and a predetermined object. The object region identifying section 212 may extract, as the object region, a region including an object which matches the predetermined object at a degree of match equal to or higher than the lower limit value for the degree of match which is stored on the condition storing section 240. The condition storing section 240 may store thereon a lower limit value for the area occupied by colors included in a predetermined color range, which is required to be found in an object which is required to be extracted from a moving image. The object region identifying section 212 extracts, as the object region, a region including an object in which the area occupied by the colors included in the predetermined color range is equal to or higher than the lower limit value for the area which is stored on the condition storing section 240.

Here, the change amount calculating section 221 and condition designating section 242 may not necessarily be provided in each image capturing apparatus 100. Alternatively, the monitoring system 110 may include therein a single change amount calculating section 221 and a single condition designating section 242. In this case, the change amount calculating section 221 may calculate the amount of a change from a predetermined reference image in each of the moving images captured by a plurality of image capturing sections 200. The output control section 270 may then convert a moving image in which the amount of the change which is calculated by the change amount calculating section 221 is lower than a predetermined lower limit value for the amount of the change into a moving image which has a smaller data amount than when the amount of the change calculated by the change amount calculating section 221 is equal to or higher than the lower limit value, and output the moving image obtained by the conversion to the transmission path 140. The condition designating section 242 may increase the lower limit value which is stored on the condition storing section 240 as the difference between the amount of data which can be transmitted per unit time via the transmission path 140 and the amount of data which is output per unit time from each of the plurality of image capturing sections 200 decreases. The match calculating section 232 may calculate the degree of match between a predetermined reference object and an object included in each of the moving images captured by the plurality of image capturing sections 200. The output control section 270 converts a moving image in which the degree of match which is calculated by the match calculating section 232 is lower than a predetermined lower limit value for the degree of match into a moving image which has a smaller data amount than when the degree of match which is calculated by the match calculating section 232 is equal to or higher than the lower limit value, and outputs the moving image obtained by the conversion to the transmission path 140. The condition designating section 242 increases the lower limit value as the difference between the amount of data which can be transmitted per unit time via the transmission path 140 and the amount of data which is output per unit time from each of the plurality of image capturing sections 200 decreases.

The image capturing control section 210 designates the image capturing range of the image capturing section 200 in such a manner that the image capturing section 200 captures a moving image including moving-image making-up images which contain therein an object and the width of which is larger in the moving direction than in the direction vertical to the moving direction, and then causes the image capturing section 200 to capture the moving image of the monitored area. The output section 290 outputs the moving image which is captured by the image capturing section 200 in such a state that the image capturing range is designated by the image capturing control section 210. Here, the image capturing control section 210 may adjust the image capturing conditions imposed on the image capturing section 200 so as to appropriately capture images of a subject included in the image capturing range which enables the image capturing section 200 to capture moving-image making-up images which contain an object and the width of which is larger in the moving direction than in the direction vertical to the moving direction. The output section 290 may output the moving image captured by the image capturing section 200 in such a state that the image capturing conditions have been adjusted by the image capturing control section 210.

The image capturing control section 210 may designate the image capturing range of the image capturing section 200 in such a manner that the image capturing section 200 captures moving-image making-up images which contain an object and in which a region positioned ahead of the object in the moving direction is larger than a region positioned behind the object in the moving direction, and cause the image capturing section 200 to capture the images. The image capturing control section 210 may adjust the image capturing conditions imposed on the image capturing section 200 so as to appropriately capture images of a subject which is included in the image capturing range which enables the image capturing section 200 to capture moving-image making-up images which contain an object and in which a region positioned ahead of the object in the moving direction is larger than a region positioned behind the object in the moving direction is captured.

The image capturing rate for the moving image captured by the image capturing section 200 may be higher than the monitor display rate. The data amount per unit time which is required for transmitting the moving images captured by all image capturing apparatuses 100 may be higher than the amount of data which can be transmitted per unit time via the transmission path 140. Note that the moving-image making-up images in the present embodiment are, for example frame images or field images. The image capturing section 200 may capture the image of the entire monitored area through a fish-eye lens.

According to the above description, the image capturing apparatus 100 captures a moving image, and transmits the captured moving image to the server 170. According to a different embodiment, however, the server 170 may have some of the functions of the image capturing apparatus 100. For example, the image capturing apparatus 100 may capture the moving image of the monitored area, and output the captured moving image without a change to the transmission path 140, and the server 170 may control the image quality of the moving image to be recorded thereon, or may control the image quality of the moving images to be displayed on the display apparatuses 180, 181, and 182. If this is the case, the server 170 may include therein the object region identifying section 212, image storing section 214, differential image generating section 216, image characteristic extracting section 220, satisfaction judging section 230, condition storing section 240, condition designating section 242, permissible data amount obtaining section 250, image quality selecting section 260, image quality storing section 262, output control section 270, image generating section 280, and output section 290. In this case, the output section 290 may record the moving images generated by the output moving image generating section 282 onto a recording medium, or may cause the moving images generated by the output moving image generating section 282 to be displayed on the display apparatuses 180, 181 and 182.

Figure 4A:
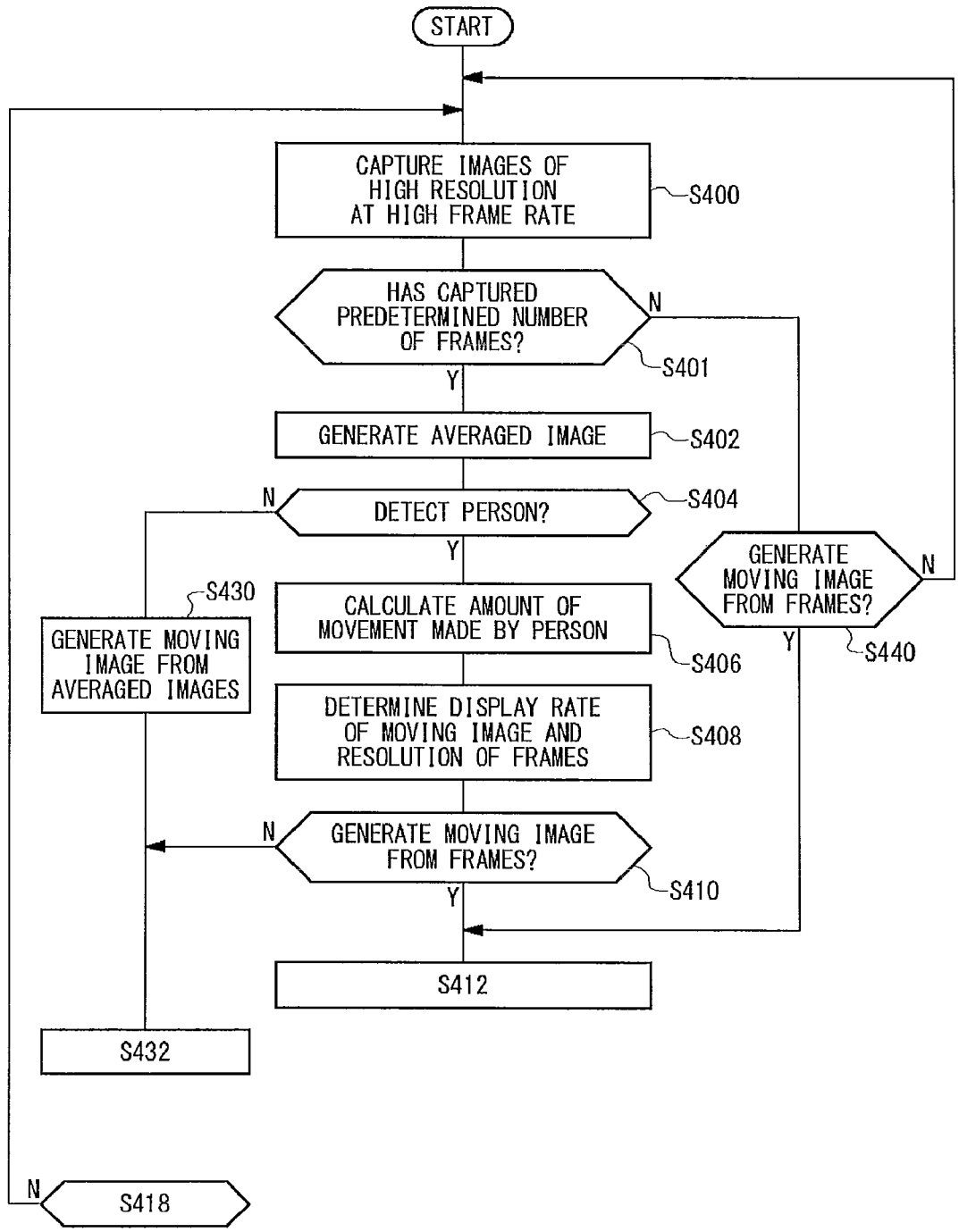
FIG. 4A illustrates an exemplary flow of operations performed by the image capturing apparatus 100.
Figure 4B:
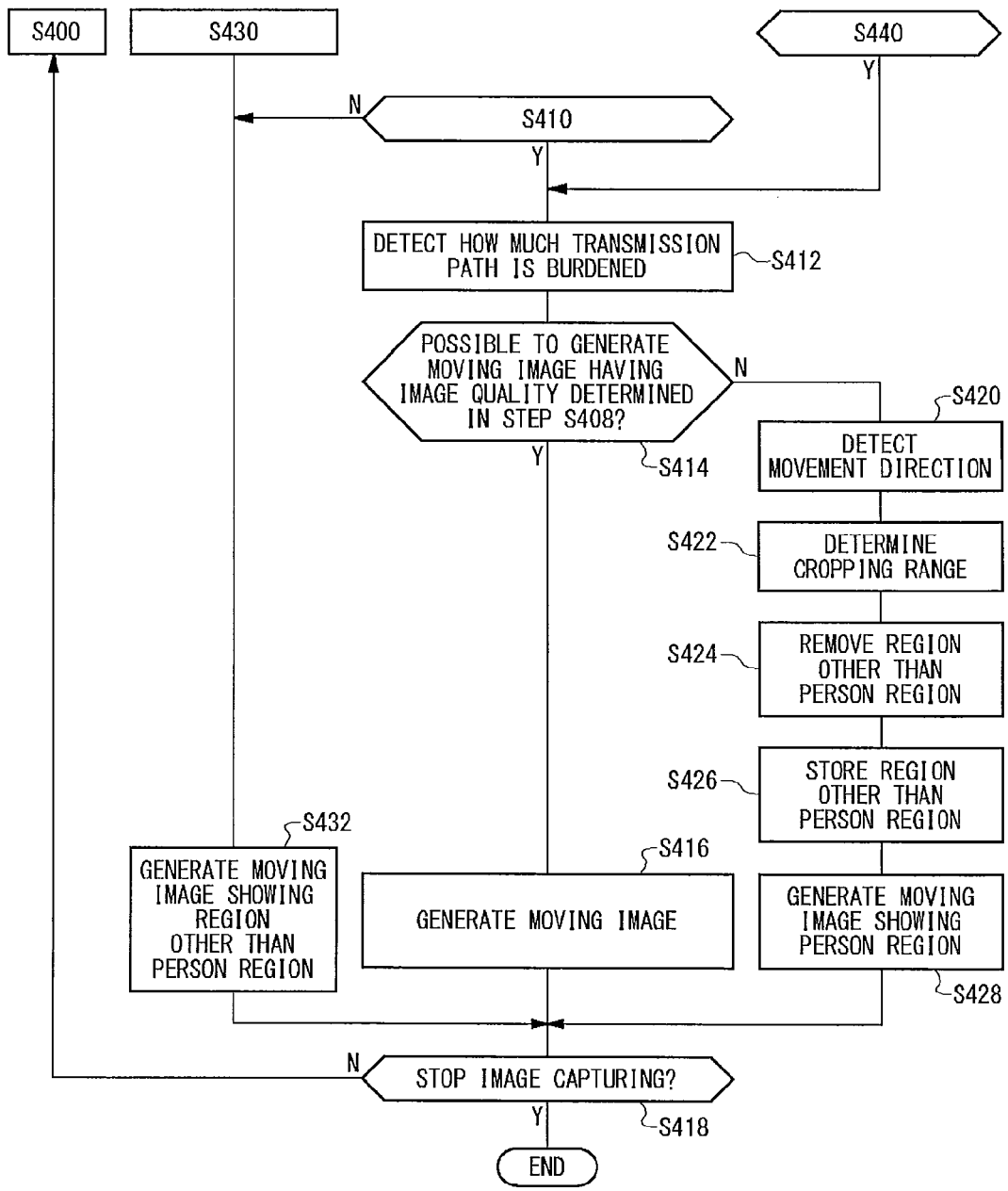
FIG. 4B illustrates an exemplary flow of operations performed by the image capturing apparatus 100.

FIGS. 4A and 4B illustrate an exemplary flow of operations performed by the image capturing apparatus 100. The image capturing section 200 captures a moving image of the monitored area, by successively capturing frame images which have a resolution higher than the monitor resolution of the display apparatuses 180 to 182 at a frame rate which is higher than the monitor display rate of the display apparatuses 180 to 182 (step S400). Here, the averaged image generating section 202 increments the averaging counter each time the image capturing section 200 captures a frame image. Based on the value shown by the averaging counter, the averaged image generating section 202 judges whether the image capturing section 200 has captured a predetermined number of frame images (step S401). When judging positively in the step S401, the averaged image generating section 202 generates an averaged image by averaging in units of a pixel the predetermined number of frame images captured by the image capturing section 200 (step S402), and sets the value of the averaging counter at zero.

After this, the satisfaction judging section 230 judges whether an object corresponding to a person is detected (step S404). To be specific, the object extracting section 225 extracts the outline of the object from the averaged image by using a technique such as edge reinforcement. The match calculating section 232 then calculates the degree of match, in terms of shape, between the region within the outline of the object which is extracted by the object extracting section 225 and a predetermined pattern of a person, by comparing the region within the outline of the object which is extracted by the object extracting section 225 and the predetermined pattern of a person to each other. For example, the match calculating section 232 may calculate the degree of match in terms of shape, by dividing the area of a portion within the outline of the object which overlaps a pattern of a person which has the same area as the object by the area of the region enclosed by the outline of the object. When the degree of match in terms of shape which is calculated by the match calculating section 232 is equal to or higher than the lower limit value for the degree of match in terms of shape which is stored on the condition storing section 240, the satisfaction judging section 230 judges that an object corresponding to a person is detected.

Here, the movement amount calculating section 222 calculates the speed at which the object which is extracted by the object extracting section 225 moves. When the satisfaction judging section 230 judges that an object corresponding to a person is detected in the step S404, the image quality selecting section 260 obtains the moving speed of the object corresponding to the person which is calculated by the movement amount calculating section 222 (step S406).

Subsequently, the image capturing apparatus 100 determines the display rate of the output moving image to be output to the transmission path 140 and the resolution of the frame images to be output to the transmission path 140 (step S408). To be specific, the image quality selecting section 260 selects a combination of the resolution and the display rate which is stored on the image quality storing section 262 in association with the area of the object corresponding to the person and the moving speed of the object corresponding to the person. For example, the resolution selected by the image quality selecting section 260 in the step S408 increases (however does not exceed the resolution of the frame images captured by the image capturing section 200) as the size of the object decreases, and the display rate selected by the image quality selecting section 260 in the step S408 increases (however, does not exceed the image capturing rate of the frame images captured by the image capturing section 200) as the moving speed of the object increases.

In accordance with the display rate selected in the step S408, the output moving image generating section 282 judges whether to generate an output moving image including output frame images which are generated based on the frame images captured by the image capturing section 200 (step S410). For example, the output moving image generating section 282 has therein a counter which is incremented each time the image capturing section 200 captures a frame image and which is initialized to zero every time a moving image is generated based on captured frame images. Here, the output moving image generating section 282 judges that the output moving image including the output frame images is generated, when the product of the value shown by the counter and the interval between the timings at which the frame images are captured by the image capturing section 200 is equal to or higher than the time interval between the output frame images included in the output moving image which is displayed at the display rate selected in the step S408.

When the output moving image generating section 282 judges positively in the step S410, the permissible data amount obtaining section 250 detects the amount of data which is transmitted per unit time via the transmission path 140 (step S412). The permissible data amount obtaining section 250 calculates a permissible data amount which corresponds to the difference between the amount of data which can be transmitted per unit time via the transmission path 140 and the amount of data which is transmitted per unit time via the transmission path 140. Alternatively, the permissible data amount obtaining section 250 may obtain the permissible data amount from the server 170.

The output moving image generating section 282 then judges whether to be capable of generating a moving image having the image quality selected in the step S408 (step S414). To be specific, the output moving image generating section 282 judges positively when the permissible data amount is equal to or higher than the amount of data which needs to be transmitted per unit time in order to transit moving image data which has the resolution and display rate selected in the step S408.

When judging positively in the step S414, the output moving image generating section 282 generates output frame images having the resolution selected in the step S408 by discarding some of the pixels forming the frame images captured by the image capturing section 200. The output moving image generating section 282 then generates a moving image including the generated output frame images, and supplies the generated moving image to the output section 290 (step S416). Subsequently, the image capturing apparatus 100 judges whether an image capturing end instruction has been received (step S418). When judging negatively in the step S418, the image capturing apparatus 100 next performs the operation in the step S400. When judging positively in the step S418, the image capturing apparatus 100 ends the operations.

After the image capturing apparatus 100 moves on to the operation in the step S400 subsequently to the judgment of ending the image capturing in the step S418, it may be judged in the step S401 that the predetermined number of frame images have not been captured. If such is the case, the output moving image generating section 282 judges whether to generate an output moving image including output frame images (step S440). In the step S440, the output moving image generating section 282 judges whether to generate an output moving image including output frame images, in accordance with the display rate which has already been determined, as in the step S410. When the output moving image generating section 282 judges positively in the step S440, the image capturing apparatus 100 next performs the operation in the step S412. When the output moving image generating section 282 judges negatively in the step S440, the image capturing apparatus 100 next performs the operation in the step S400.

When judging negatively in the step S414, the output moving image generating section 282 obtains the movement direction of the object corresponding to the person (step S420). To be specific, the output moving image generating section 282 obtains the moving direction which is identified by the moving direction identifying section 223 for the object corresponding to the person, as the movement direction of the object.

Following this, the output moving image generating section 282 determines the cropping range for the frame images captured by the image capturing section 200 (step S422). To be specific, the output moving image generating section 282 determines the cropping range in such a manner as to obtain a cropped image which includes the object corresponding to the person and the width of which is larger in the movement direction of the object than in the direction vertical to the movement direction. Hereinafter, the region within the cropping range is referred to as a person region. The output moving image generating section 282 generates cropped images showing the person region by cropping the frame images in accordance with the cropping range determined in the step S422 (step S424). Here, the image storing section 214 stores thereon the images showing the removed region as a result of the cropping (the images of the region other than the person region) (step S426). The output moving image generating section 282 then generates a moving image including the cropped images obtained in the step S424, and supplies the generated moving image to the output section 290 (step S428). The image capturing apparatus 100 next performs the operation in the step S418.

When the satisfaction judging section 230 does not detect the object corresponding to the person in the step S404, the output moving image generating section 282 generates a moving image based on the averaged images, and supplies the moving image to the output section 290 (step S430). Here, the output moving image generating section 282 may generate a moving image including output frame images which are generated by appropriately discarding some of the pixels of the averaged images and thus have a reduced amount of data, and supply the generated moving image to the output section 290. Alternatively, the output moving image generating section 282 may generate a moving image including output frame images which are generated by appropriately discarding some of the pixels forming the frame images captured by the image capturing section 200 and thus have a reduced amount of data, and supply the generated moving image to the output section 290.

Subsequently, the output control section 270 supplies, to the output section 290, a moving image including the images of the region other than the person region which are stored on the image storing section 214 in the step S426 (step S432). Also, when the output moving image generating section 282 judges that the output moving image is generated based on the frame images in the step S410, the image capturing apparatus 100 proceeds to the operation in the step S432, and the output control section 270 supplies, to the output section 290, the moving image including the images of the region other than the person region which are stored in the step S426 onto the image storing section 214. In the step S432, the output control section 270 may cause the output section 290 to output the individual images of the region other than the person region, instead of generating the moving image including the images of the region other than the person region and supplying the generated moving image to the output section 290.

As described above, when detecting movement made by a person, the image capturing apparatus 100 transmits to the server 170 a moving image which has a higher resolution and a higher display rate than when not detecting such a movement of a person. Here, when the transmission path 140 is heavily burdened, the image capturing apparatus 100 transmits to the server 170 a moving image including frame images that only show at a high resolution the region of the original frame images in which the movement of the person is detected and are obtained by removing the remaining region by the cropping. After this, when the movement of the person becomes no longer detected, the image capturing apparatus 100 transmits the images showing the region other than the person region which has been removed by the cropping. As a result, the image capturing apparatus 100 can reduce the time period required for the transmission of the moving image data to the server 170, even when the transmission path 140 is heavily burdened.

FIG. 5 illustrates, as an example, image quality information stored on the image quality storing section 262 by using a table. The image quality storing section 262 stores thereon the resolution PR of output frame images included in a moving image to be output and the display rate FR of the moving image to be output, in association with the area S occupied by a person and the speed V of a movement. For example, when the area S of the person is no less than S1 and less than S2 and the speed V of the movement is less than V1, the resolution PR of the output frame images is PR3 and the display rate FR of the moving image to be output is FR1, according to the image quality storing section 262.

The resolutions PR1, PR2, PR3 and PR4 are defined as PR4>PR3>PR2>PR1, and the display rates FR1, FR2, FR3 and FR4 are defined as FR4>FR3>FR2>FR1. In other words, the display rate FR stored on the image quality storing section 262 increases as the speed of the movement increases, and the resolution PR stored on the image quality storing section 262 increases as the area of the person decreases. With such a configuration, the image capturing apparatus 100 decreases the resolution of the frame images as the dimensions of the person in the frame images increase. In this way, the image capturing apparatus 100 can prevent the data amount of the moving image to transmit from unnecessarily increasing. In addition, the image capturing apparatus 100 increases the display rate as the speed of the movement made by the person increases. In this way, the image capturing apparatus 100 can provide a moving image which enables a monitoring person to easily realize what the person is doing.

According to the above description, the image quality storing section 262 stores thereon the resolution PR of the output frame images and the display date FR of the moving image to be output in association with the area S of the person and the speed V of the movement. Alternatively, the image quality storing section 262 may store thereon, in association with the area S of the person and the speed V of the movement, the resolution PR of the output frame images, the number of gray levels, and the display rate FR of the moving image to be output. For example, the number of gray levels stored on the image quality storing section 262 may decrease as the area of the person increases. As the area of the person increases, the number of gray levels for the output frame images which are used by the output moving image generating section 282 to generate the output moving image may decrease.

As described above, the condition storing section 240 stores thereon condition to be satisfied by an object which is required to be extracted from the images captured by the image capturing section 200. The object extracting section 225 extracts an object which satisfies the condition from the image captured by the image capturing section 200. The image quality of the images generated by the image generating section 280 based on the images captured by the image capturing section 200 decreases as the size of the object extracted by the object extracting section 225 increases. The output section 290 outputs the image generated by the images generating section 280.

For example, the condition storing section 240 stores thereon a lower limit value for the degree of match between an object required to be extracted and a predetermined object. The object extracting section 225 extracts, from the moving image captured by the image capturing section 200, an object which matches the predetermined object with the degree of the match being higher than the lower limit value which is stored on the condition storing section 240. The image quality of the images generated by the image generating section 280 based on the images captured by the image capturing section 200 decreases as the size of the object extracted by the object extracting section 225 increases.

The condition storing section 240 stores thereon a lower limit value for the area occupied by colors included in a predetermined color range, which is required to be found in an object to be extracted. The object extracting section 225 extracts, from the moving image captured by the image capturing section 200, an object in which the area occupied by the colors included in the predetermined color range is equal to or higher than the lower limit value for the area which is stored on the condition storing section 240. The image quality of the images generated by the image generating section 280 based on the images captured by the image capturing section 200 decreases as the size of the object extracted by the object extracting section 225 increases.

To be specific, as the size of the object extracted by the object extracting section 225 increases, the resolution of the images generated by the image generating section 280 based on the images captured by the image capturing section 200 decreases. Alternatively, as the size of the object extracted by the object extracting section 225 increases, the number of gray levels of the images generated by the image generating section 280 based on the images captured by the image capturing section 200 decreases.

Figure 6:
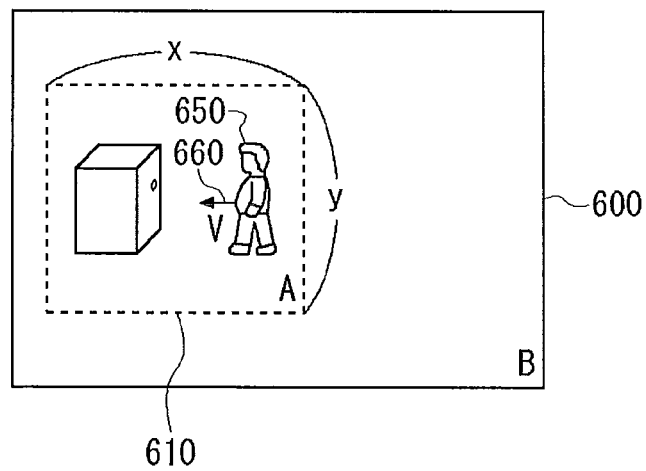
FIG. 6 illustrates an example of a cropped image which is generated by an output moving image generating section 282.

FIG. 6 illustrates an example of the cropped image generated by the output moving image generating section 282. The output moving image generating section 282 generates, based on an image 600, a cropped image A which is to be included in the moving image to be output from the output section 290. Here, the image 600 may be one of the frame images making up the moving image captured by the image capturing section 200, or the averaged image generated by the averaged image generating section 202. The moving direction identifying section 223 and movement amount calculating section 222 respectively calculate a moving direction 660 of a person 650 in the image 600 and the speed V of the movement made by the person 650, based on the change in the position of the same person 650 which is extracted by the object extracting section 225, between a plurality of successive images.

Subsequently, the output moving image generating section 282 determines a cropping box 610 (the step S422 in FIG. 4B). In the cropping box 610, the person 650 is contained and the width x of the cropping box 610 in the moving direction which is identified by the moving direction identifying section 223 is larger than the width y of the cropping box 610 in the direction vertical to the moving direction. According to the example shown in FIG. 6, the output moving image generating section 282 determines the cropping box 610 in which the region ahead of the person 650 in the moving direction which is identified by the moving direction identifying section 223 is larger than the region behind the person 650 in the moving direction.

After this, the output moving image generating section 282 generates a moving image which has the cropped image A within the cropping box 610 as an output frame image associated with the timing at which the image 600 is captured, and supplies the generated moving image to the output section 290 (the step S428 in FIG. 4B). Here, the image storing section 214 stores thereon an image B showing the region outside the cropping box 610 (the step S426 in FIG. 4B). The output section 290 transmits the image B which is stored on the image storing section 214 when the permissible data amount becomes larger than the amount of the moving image data output from the output section 290 (the step S432 in FIG. 4B).

As described above, the image generating section 280 generates, by using the cropping technique and based on the moving-image making-up images included in the moving image captured by the image capturing section 200, moving-image making-up images which include an object and in which the region ahead of the object in the moving direction is larger than the region behind the object in the moving direction. With such a configuration, the image capturing apparatus 100 can transmit, to the server 170, images which are cropped so as to include not only the person 650 but also the region towards which the person 650 moves. Therefore, the image capturing apparatus 100 can provide a moving image which shows a subject desired by the monitoring person with it being possible to reduce the amount of data transmitted when compared with a case where the captured images showing the entire region are transmitted. As a result the image capturing apparatus 100 can swiftly supply, to the server 170, a moving image whose contents enable the monitoring person to satisfactorily monitor the person 650, even when the transmission path 140 is congested and has no room for transmitting the moving image showing the entire region.

Figure 7:
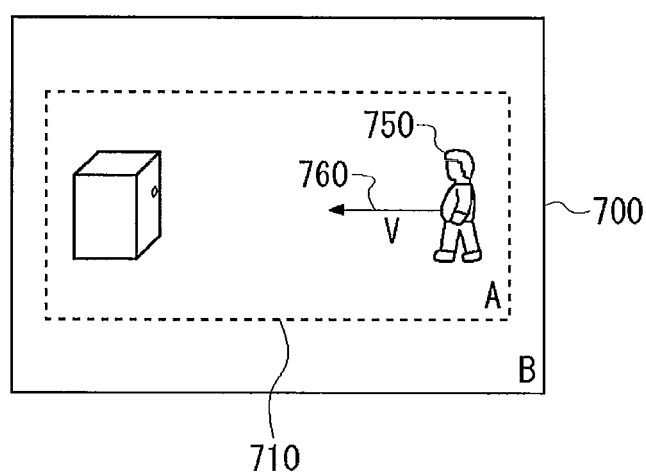
FIG. 7 illustrates a different example of the cropped image.

FIG. 7 illustrates a different example of the cropped image which is generated by the output moving image generating section 282. According to the example shown in FIG. 7, the speed of the movement which is calculated by the movement amount calculating section 222 is higher than in the example shown in FIG. 6. In this case, the output moving image generating section 282 designates a cropping box 710 in order that the cropped image A has a larger width in the direction 760 identified by the moving direction identifying section 223 than in the exemplary case described with reference to FIG. 6. With such a configuration, the image capturing apparatus 100 can supply to the server 170 images which enable the monitoring person to accurately know for what purpose the person makes the movement even when the person moves fast.

Figure 8:
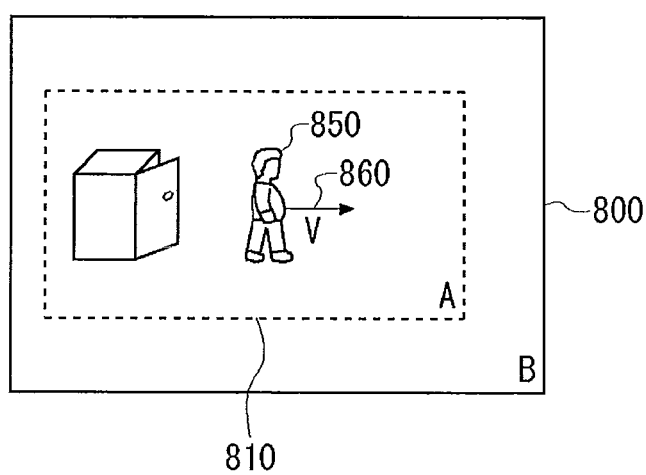
FIG. 8 illustrates a further different example of the cropped image.

FIG. 8 illustrates a further different example of the cropped image which is generated by the output moving image generating section 282. According to the example shown in FIG. 8, the output moving image generating section 282 determines a cropping box 810 in which a person 850 is positioned in substantially the center. Here, the image generating section 280 generates, by using the cropping technique and based on the moving-image making-up images included in the moving image captured by the image capturing section 200, moving-image making-up images which include the object extracted by the object extracting section 225 and in which the region ahead of the object in the moving direction is larger than the region behind the object in the moving direction. Which is to say, the output moving image generating section 282 determines the cropping box 810 in order to obtain the cropped image A in which the region ahead of the person 850 in the moving direction and the region behind the person 850 in the moving direction are substantially the same. With such a configuration, the image capturing apparatus 100 can supply to the server 170 images which enable the monitoring person to appropriately monitor the regions ahead and behind the person 850.

According to the above description with reference to FIGS. 6 to 8, the image capturing apparatus 100 crops the frame images captured or averaged images, for example. Alternatively to a case where the images are cropped by using the cropping boxes 610, 710 and 810, however, the image capturing control section 210 may adjust the image capturing conditions for the subjects within the cropping boxes 610, 710 and 810, and then cause the image capturing section 200 to capture images of the subjects. For example, the image capturing control section 210 may control the image capturing direction and zoom setting of the image capturing section 200 in such a manner that the ranges within the cropping boxes 610, 710 and 810 are the ranges to be image-captured by the image capturing section 200.

Figure 9:
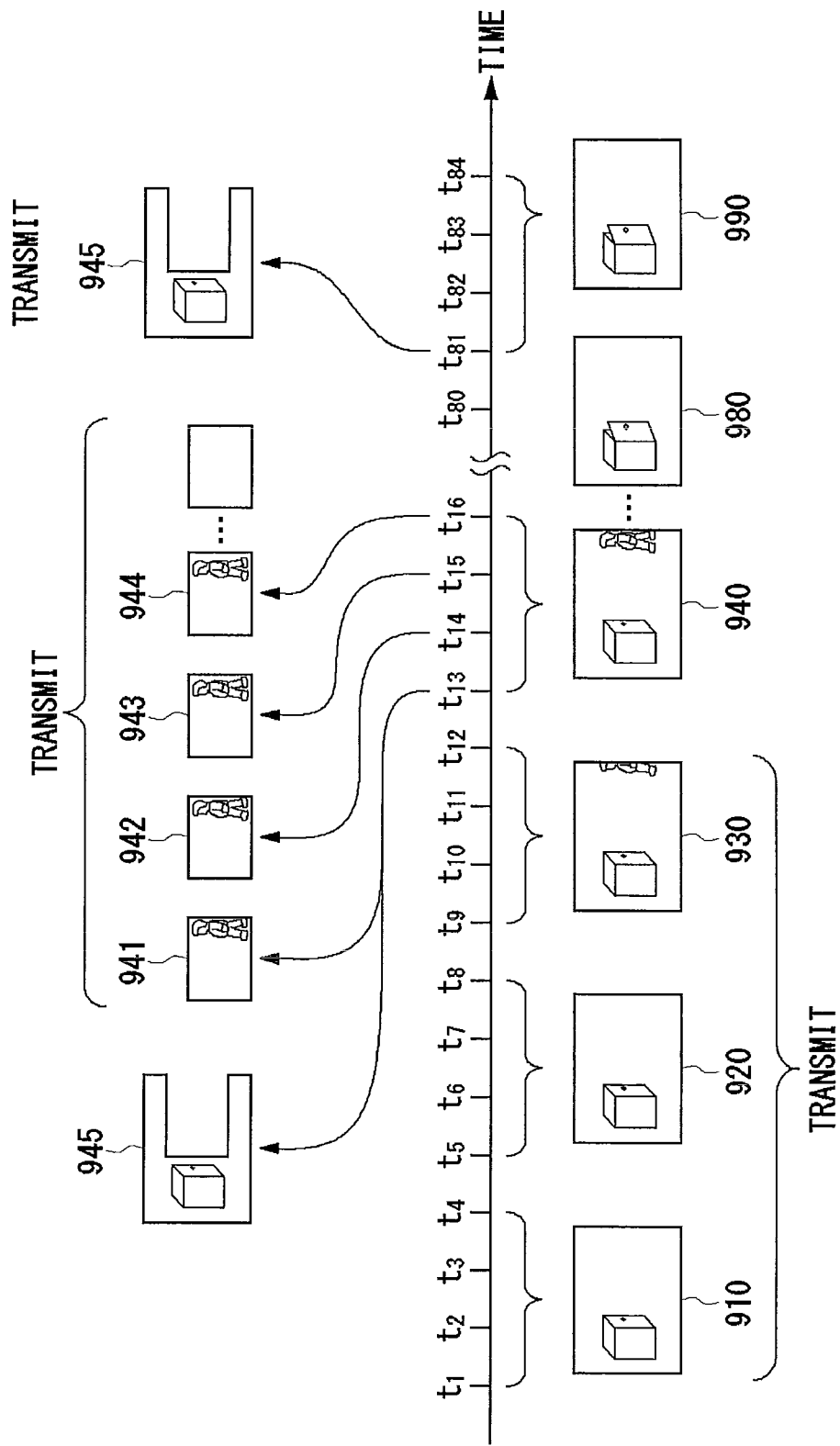
FIG. 9 illustrates exemplary frame images which are output from an output section 290 in a chronological order.

FIG. 9 illustrates, in a chronological order, exemplary frame images included in the moving image output from the output section 290. The averaged image generating section 202 generates each of averaged images 910, 920, 930, 940, . . . , 980, 990, . . . by averaging four frame images which are successively captured by the image capturing section 200. When no change is found between successive averaged images, the output moving image generating section 282 supplies to the output section 290 a moving image made up by output frame images which are displayed at an interval which is n times (n is a predetermined number and, for example, four) as long as the interval at which the image capturing section 200 captures frame images. For example, the output moving image generating section 282 supplies to the output section 290 a moving image which includes, as the output frame images, averaged images each of which is obtained by averaging a predetermined number of successive frame images (for example, the averaged images 910, 920 and 930). Here, the output moving image generating section 282 may supply to the output section 290 a moving image which includes, as the output frame images, images each of which is generated by appropriately discarding some of the pixels making up an averaged image, or may supply to the output section 290 a moving image which includes differential images which are generated by the differential image generating section 216 based on successive averaged images. Alternatively, the output moving image generating section 282 may identify a time period during which the moving-image making-up images which are averaged to generate the averaged image are captured, and may supply to the output section 290 a moving image which includes, as the output frame images, the images each of which is obtained by discarding some of the pixels of a corresponding one of the moving-image making-up images captured during the identified time period. As another alternative example, the output moving image generating section 282 may supply, to the output section 290, a moving image which includes, as the output frame images, only part of the moving-image making-up images captured during the identified time period.

When (for example, at times t12 and t16) a change is detected between successive averaged images (for example, between the averaged images 920 and 930 and between the averaged images 930 and 940) and the satisfaction judging section 230 judges that there is an object corresponding to a person in an averaged image (for example, the averaged images 930 and 940), the output moving image generating section 282 supplies to the output section 290 a moving image which includes the frame images captured by the image capturing section 200 after the time t12.

Here, as described with reference to the steps S420 to S428 in FIG. 4B, the output moving image generating section 282 may supply to the output section 290 a moving image which includes, as the output frame image, a cropped image 941 which is cropped by using the cropping box described with reference to FIGS. 6 to 8. The image storing section 214 stores thereon an image 945 which shows a region removed as a result of the cropping. Until a time t80 at which the movement of the person becomes no longer detected, the output moving image generating section 282 generates a moving image including the output frame images arranged at the interval equal to the interval at which the image capturing section 200 captures frame images, and supplies the generated moving image to the output section 290. Although it is not shown in FIG. 9 for the purpose of intelligibility, the image storing section 214 may store thereon the images which show the region removed as a result of the cropping also from the time t14 to the time t80.

When the change becomes no longer detected between successive averaged images, for example, between the averaged images 980 and 990, the output moving image generating section 282 restarts supplying to the output section 290 the moving image which includes an averaged image as one output frame image. Here, the output control section 270 causes the output section 290 to output the image 945 stored on the image storing section 214. The output control section 270 may divide the image 945 into a plurality of regions and cause the output section 290 to sequentially output the images showing the plurality of regions, in order to satisfy such a condition that the amount of data which is output per unit time from the output section 290 is equal to or lower than the permissible data amount which is obtained by the permissible data amount obtaining section 250.

The image storing section 214 may store thereon all of the frame images captured by the image capturing section 200 from the time t13 to the time t80, and cause the output section 290 to output a moving image which has, as one output frame image, each of the frame images stored on the image storing section 214 on or after the time t81 at which the change becomes no longer detected. Here, the output control section 270 may determine the size, resolution or number of gray levels of the images to be transmitted from the output section 290, in such a manner that the total amount of data which is output per unit time from the output section 290 is equal to or lower than the permissible data amount which is obtained by the permissible data amount obtaining section 250. Note that the output control section 270 causes the output section 290 to output timing information indicating the timing at which each image is captured, in addition to the frame images (or the image 945) stored on the image storing section 214.

As described above, the variation reduced image generating section 201 generates a variation reduced image at an interval equal to a predetermined time duration by using a plurality of moving-image making-up images included in a moving image captured by the image capturing section 200 during a time period having the predetermined time duration. Assume a case where the variation reduced image generating section 201 generates a first variation reduced image by using a plurality of moving-image making-up images included in the moving image captured by the image capturing section 200 during a first period. When the satisfaction judging section 230 judges that the first variation reduced image does not satisfy the condition, the output moving image generating section 282 uses the first variation reduced image as the moving-image making-up image of the output moving image corresponding to the first period. When the satisfaction judging section 230 judges that the first variation reduced image satisfies the condition, the output moving image generating section 282 uses the moving image captured by the image capturing section 200 during the first period as the output moving image corresponding to the first period. To be specific, the averaged image generating section 202 averages a plurality of moving-image making-up images included in a moving image captured by the image capturing section 200 during a period having a predetermined time duration, to generate averaged images at an interval equal to the predetermined time duration. Assume a case where the averaged image generating section 202 generates a first averaged image by averaging a plurality of moving-image making-up images included in the moving image captured by the image capturing section 200 during a first period. When the satisfaction judging section 230 judges that the first averaged image does not satisfy the condition, the output moving image generating section 282 uses the first averaged image as the moving-image making-up image of the output moving image corresponding to the first period. When the satisfaction judging section 230 judges that the first averaged image satisfies the condition, the output moving image generating section 282 uses the moving image captured by the image capturing section 200 during the first period as the output moving image corresponding to the first period.

The variation reduced image generating section 201 may generate a variation reduced image at an interval equal to a predetermined time duration by using a plurality of moving-image making-up images included in a moving image which is captured by the image capturing section 200 during a time period having the predetermined time duration. Assume a case where the variation reduced image generating section 201 generates a first variation reduced image by using a plurality of moving-image making-up images included in the moving image captured by the image capturing section 200 during a first period. When the satisfaction judging section 230 judges that the first variation reduced image does not satisfy the condition, the output moving image generating section 282 may use a variation reduced image which is generated by the variation reduced image generating section 201 by using a plurality of moving-image making-up images captured by the image capturing section 200 during a second period which follows the first period, as the moving-image making-up image of the output moving image corresponding to the second period. When the satisfaction judging section 230 judges that the first variation reduced image satisfies the condition, the output moving image generating section 282 may use the moving image captured by the image capturing section 200 during the second period as the output moving image corresponding to the second period. To be specific, the averaged image generating section 202 may average a plurality of moving-image making-up images included in a moving image which is captured by the image capturing section 200 during a period having a predetermined time duration, to generate averaged images at an interval equal to the predetermined time duration. Assume a case where the averaged image generating section 202 generates a first averaged image by averaging a plurality of moving-image making-up images included in the moving image captured by the image capturing section 200 during a first period. When the satisfaction judging section 230 judges that the first averaged image does not satisfy the condition, the output moving image generating section 282 may use an averaged image which is generated by the averaged image generating section 202 by averaging a plurality of moving-image making-up images captured by the image capturing section 200 during a second period which follows the first period, as the moving-image making-up image of the output moving image corresponding to the second period. When the satisfaction judging section 230 judges that the first averaged image satisfies the condition, the output moving image generating section 282 may use the moving image captured by the image capturing section 200 during the second period as the output moving image corresponding to the second period.

Note that the variation reduced image generating section 201 may determine the time duration during which a plurality of moving-image making-up images are captured to generate a single variation reduced image, in such a manner that the display rate of the moving image which is made up by a plurality of variation reduced images becomes lower than the display rate of the moving image which can be transmitted at the rate equal to the data amount obtained by the permissible data amount obtaining section 250. Based on the determined time duration, the variation reduced image generating section 201 may generate a variation reduced image at an interval equal to the determined time duration by using the moving-image making-up images included in the moving image captured by the image capturing section 200 during a time period having the determined time duration. To be specific, the averaged image generating section 202 may determine the time duration during which a plurality of moving-image making-up images are captured to generate a single averaged image, in such a manner that the display rate of the moving image which is made up by a plurality of averaged images becomes lower than the display rate of the moving image which can be transmitted at the rate equal to the data amount obtained by the permissible data amount obtaining section 250. Based on the determined time duration, the averaged image generating section 202 may average the moving-image making-up images included in the moving image captured by the image capturing section 200 during a period having the determined time duration, so as to generate averaged images at an interval equal to the determined time duration.

Figure 10:
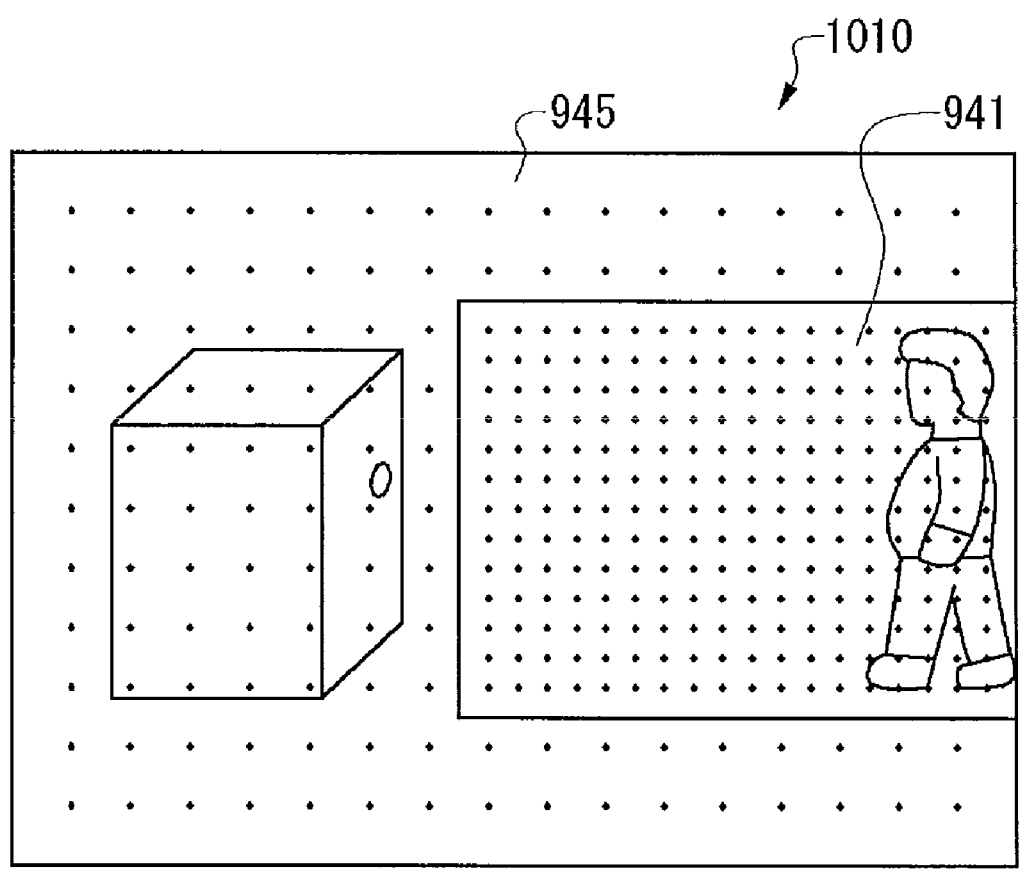
FIG. 10 illustrates an exemplary output frame image which is generated by the output moving image generating section 282.

FIG. 10 illustrates an example of the output frame image generated by the output moving image generating section 282. To be more specific, FIG. 10 illustrates a different example of the output frame image which is generated by the output moving image generating section 282 based on the frame image captured by the image capturing section 200 at the time t13 in FIG. 9. According to the example shown in FIG. 9, the output moving image generating section 282 generates a moving image which has, as output frame images, cropped images including the region in which the person is present based on the frame images captured by the image capturing section 200, and causes the output section 290 to output the generated moving image. According to the example shown in FIG. 10, the output moving image generating section 282 alternatively generates a moving image which includes an output frame image 1010 in which the resolution is higher in the region in which the person is present than in the region other than the region in which the person is present and causes the output section 290 to output the generated moving image.

The output moving image generating section 282 generates the output frame image 1010, based on the frame image captured by the image capturing section 200, by discarding more pixels in the region other than the region in which the person is present than in the region in which the person is present. Here, the output moving image generating section 282 may additionally cause the output section 290 to output resolution information indicating resolutions in the regions defined in the output frame image 1010. The image storing section 214 may store thereon an image expressed by the pixels discarded by the output moving image generating section 282. The output control section 270 may cause the output section 290 to output the image stored on the image storing section 214 after the time t81.

As described in the preceding section, the moving image captured by the image capturing section 200 has a larger data amount than the moving image whose number of pixels, number of gray levels, and display rate are compatible with the display apparatuses 180 to 182. Also, the moving image captured by the image capturing section 200 has a data amount that is larger than the data amount which can be transmitted per unit time from each image capturing appara- tus 100 via the transmission path 140. The output moving image generating section 282 and output control section 270 reduce the amount of data which is output per unit time from the output section 290, by controlling the image quality (for example, the resolution, number of gray levels and display rate) of the moving image output from the output section 290.

Figure 11:
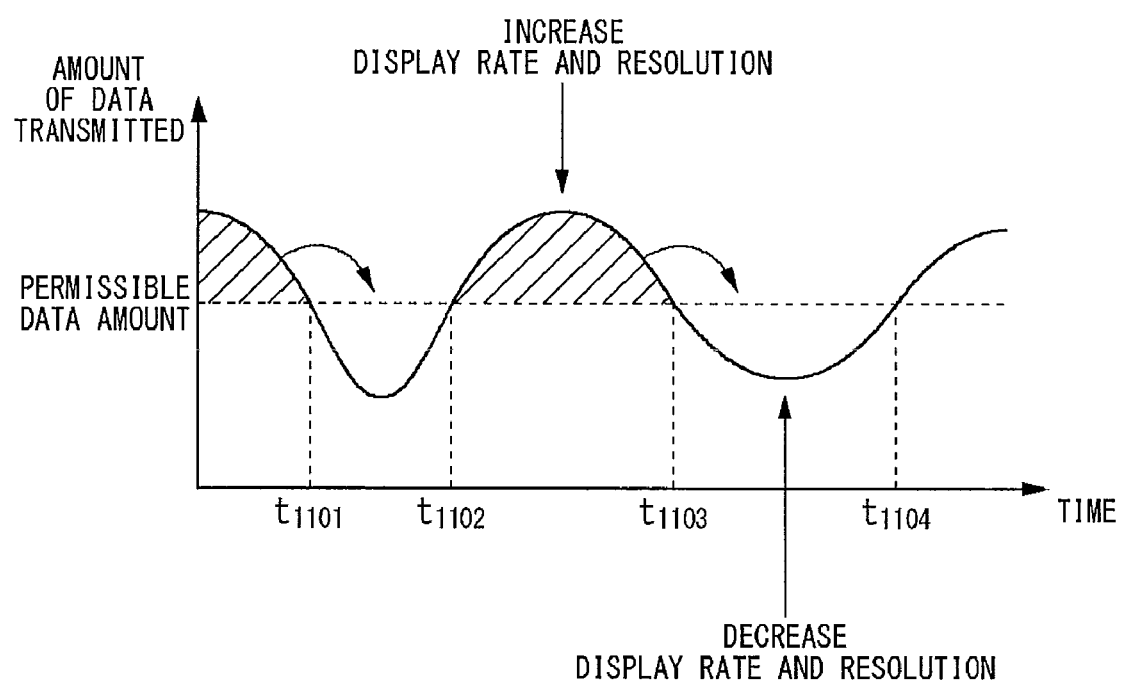
FIG. 11 illustrates, as an example, the variation over time in the amount of data which is output from the output section 290 to a transmission path 140.

FIG. 11 illustrates, as an example, the variation over time in the amount of data which is required to be output from the output section 290 to the transmission path 140. The permissible data amount obtaining section 250 obtains the amount of data which can be transmitted per unit time from each image capturing apparatus 100 via the transmission path 140, as the permissible data amount which is the amount of data which can be transmitted per unit time via the transmission path 140. As described with reference to FIGS. 1 to 10, the output moving image generating section 282 and output control section 270 control the resolution, number of gray levels, and display rate of the moving image to be output from the output section 290, in order to prevent the amount of data which is output per unit time from the output section 290 from exceeding the permissible data amount.

For example, when a movement of a person is detected, the output moving image generating section 282 may attempt to transmit a moving image which is captured by the image capturing section 200 and thus has a high display rate or high resolution. In this case, the amount of data which is output per unit time from the output section 290 exceeds the permissible data amount, for example, as in the period from the time t1102 to the time t1103. To deal with this problem, the output moving image generating section 282 generates a moving image having a lower data amount in order to lower the amount of data which is output per unit time from the output section 290 to the permissible data amount. For example, the output moving image generating section 282 crops the frame images captured by the image capturing section 200 in order to generate a moving image only showing a region in which a person is present, or appropriately discards some of the pixels making up the frame images in accordance with the speed of a movement made by a person. The output control section 270 causes the output section 290 to output the images removed as a result of the cropping during the period from the time t1102 to the time t1103 or the images expressed by the pixels discarded during the period from the time t1102 to the time t1103, during a period in which the amount of data which is output per unit time from the output section 290 is smaller than the permissible data amount (for example, during the period from the time t1103 to the time t1104). The above-described control produces an effect that the moving image transmitted from the image capturing apparatus 100 to the server 170 can have a data amount substantially equal to the permissible data amount. As a result, the monitoring system 110 can efficiently use the bandwidth of the transmission path 140.

FIG. 12 illustrates, as an example, the conditions stored on the condition storing section 240. The condition storing section 240 stores thereon lower limit values (S1, V1, Sα, Sβ, sγ, and md) for the area occupied by the person, the speed of the movement made by the object, the area of the changed region, the area occupied by particular colors, the degree of match in terms of shape between the detected object and the reference object, and the degree of match between the movement direction and the reference direction. When an object is detected in the averaged image generated by the averaged image generating section 202 and, in terms of the detected object, one of the area of the person, the speed of the movement made by the object, the area of the changed region, the area occupied by particular colors, the degree of match in terms of shape between the detected object and the reference object, and the degree of match between the reference direction and the movement direction has a value equal to or higher than a corresponding one of the lower limit values stored on the condition storing section 240, the satisfaction judging section 230 judges that the averaged image satisfies the conditions stored on the condition storing section 240. If such positive judgment is made, the output moving image generating section 282 generates a moving image which has a higher image quality than when the satisfaction judging section 230 judges that the averaged image does not satisfy the conditions stored on the condition storing section 240, based on the moving image captured by the image capturing section 200, as described with reference to FIGS. 1 to 11.

The condition storing section 240 may store thereon, as the lower limit value for the area of the changed region, a lower limit value for the number of pixels whose pixel values change by an amount equal to or more than a predetermined value between frame images captured by the image capturing section 200 or between averaged images generated by the averaged image generating section 202. Alternatively, the condition storing section 240 may store thereon, as the lower limit value for the area of the changed region, a lower limit value for the ratio between the number of pixels whose pixel values change by an amount equal to or more than a predetermined value and the number of all the pixels in the frame image or averaged image. Here, the pixel value may denote a luminance value.

The condition storing section 240 may store thereon, as the lower limit value for the area occupied by particular colors, a lower limit value for the number of pixels which have a color included in a predetermined color range in the frame image or averaged image. The condition storing section 240 may store thereon, as the lower limit value for the area occupied by particular colors, a lower limit value for the ratio between the number of pixels which have a color included in the predetermined color range and the number of all the pixels in the frame image or averaged image.

The condition storing section 240 may store thereon, as the lower limit value for the degree of match in terms of shape between the detected object and the reference object, a lower limit value for the area of the overlap between the object contained in the frame image or averaged image and the predetermined reference object of the same size. The condition storing section 240 may store thereon, as the lower limit value for the degree of match in terms of shape between the detected object and the reference object, a lower limit value for the ratio of the area of the overlap between the object contained in the frame image or averaged image and the predetermined reference object of the same size to the area of the object.

The condition storing section 240 may store thereon, as the lower limit value for the degree of match between the reference direction and the movement direction, a lower limit value for an indicator value which is inversely proportional to the angle formed between the movement direction of the object contained in the frame image or averaged image and the predetermined reference direction. Here, the reference direction may be a predetermined direction in the frame image or averaged image, or a predetermined direction in the real space. The condition storing section 240 may store thereon, as the lower limit value for the degree of match between the reference direction and the movement direction, a lower limit value for the indicator value which is inversely proportional to the angle formed between the direction in which a subject indicated by the object contained in the frame image or averaged image moves and the direction from the position of the subject to the image capturing section 200.

Figure 13:
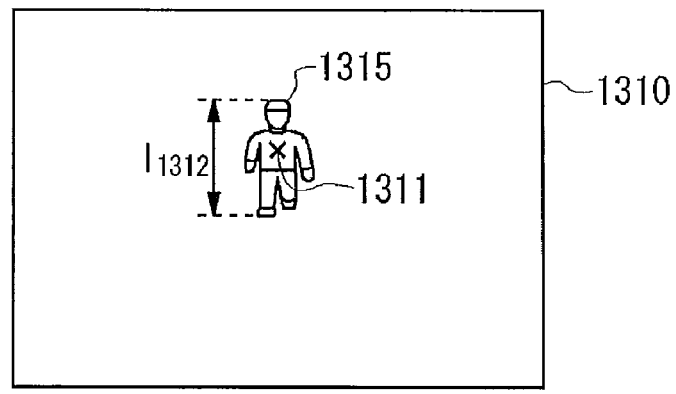
FIG. 13 illustrates exemplary frame images in which a subject approaching towards an image capturing section 200 is captured.
Figure 13:
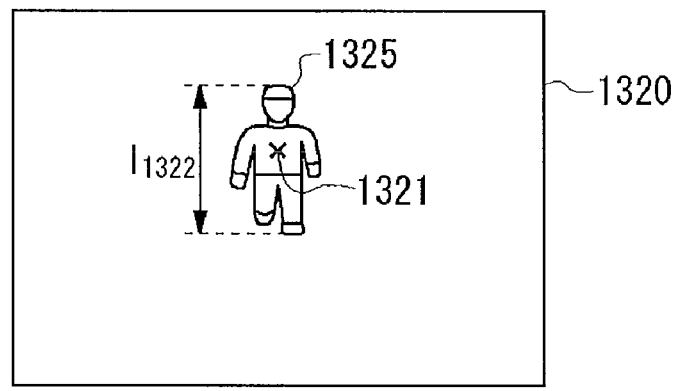
Figure 13:
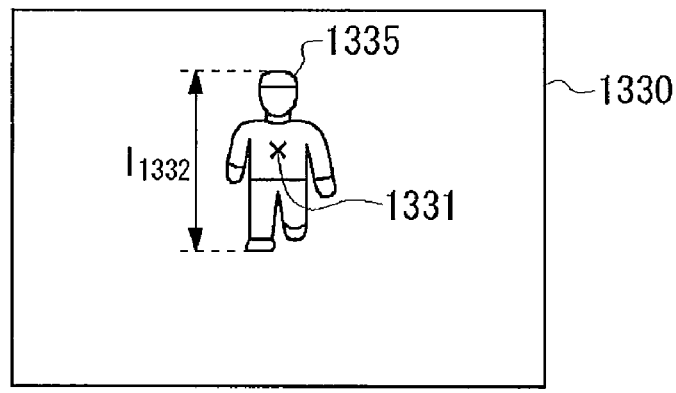

FIG. 13 illustrates, as an example, frame images 1310, 1320 and 1330 which captures therein a subject approaching towards the image capturing section 200. The moving direction identifying section 223 calculates the positions of barycenters 1311, 1321 and 1331 of objects 1315, 1325 and 1335 which are extracted by the object extracting section 225 from the frame images 1310, 1320 and 1330 captured by the image capturing section 200. Also, the moving direction identifying section 223 calculates the lengths $l_{1312}$, $l_{1322}$ and $l_{1332}$ of the objects extracted by the object extracting section 225 from the frame images 1310, 1320 and 1330.

Subsequently, the moving direction identifying section 223 calculates the increasing rate at which the length of the object increases between the frame images 1310, 1320 and 1330 and the changing rate at which the position of the barycenter of the object changes between the frame images 1310, 1320 and 1330. When the increasing rate of the length of the object is equal to or higher than a predetermined reference value, and the changing rate of the position of the barycenter of the object is lower than a predetermined reference value, the moving direction identifying section 223 judges that the subject indicated by the object is approaching towards the image capturing section 200.

Here, the condition storing section 240 may store thereon a condition which is used to determine whether the barycenter of the object moves towards the center in the image. When the position of the barycenter moves towards the center in the image, the satisfaction judging section 230 judges that the image satisfies the condition stored on the condition storing section 240. In addition to the condition which is used to determine whether the barycenter of the object moves towards the center in the image, the condition storing section 240 may store thereon a condition which is related to the change in the size of the object. For example, the condition storing section 240 may store thereon a condition used to judge whether, between the moving-image making-up images or averaged images, the increasing rate of the length of the object is higher than a predetermined increasing rate and the barycenter of the object moves towards the center in the image, or a condition used to judge whether, between the moving-image making-up images or averaged images, the increasing rate of the length of the object is higher than the predetermined increasing rate and the barycenter of the object is positioned in the vicinity of the center of the image.

As described above, the image capturing apparatus 100 can increase the image quality of the moving image to output, when detecting a subject moving towards the image capturing section 200. With such a configuration, the image capturing apparatus 100 can appropriately monitor a person who approaches towards an object to be protected against theft, with the image capturing section 200 being provided in the object to be protected. Also, the image capturing apparatus 100 can appropriately monitor a person who attempts to obstruct the operation of the image capturing apparatus 100, for example, by covering the image capturing section 200 with cloth.

Figure 14:
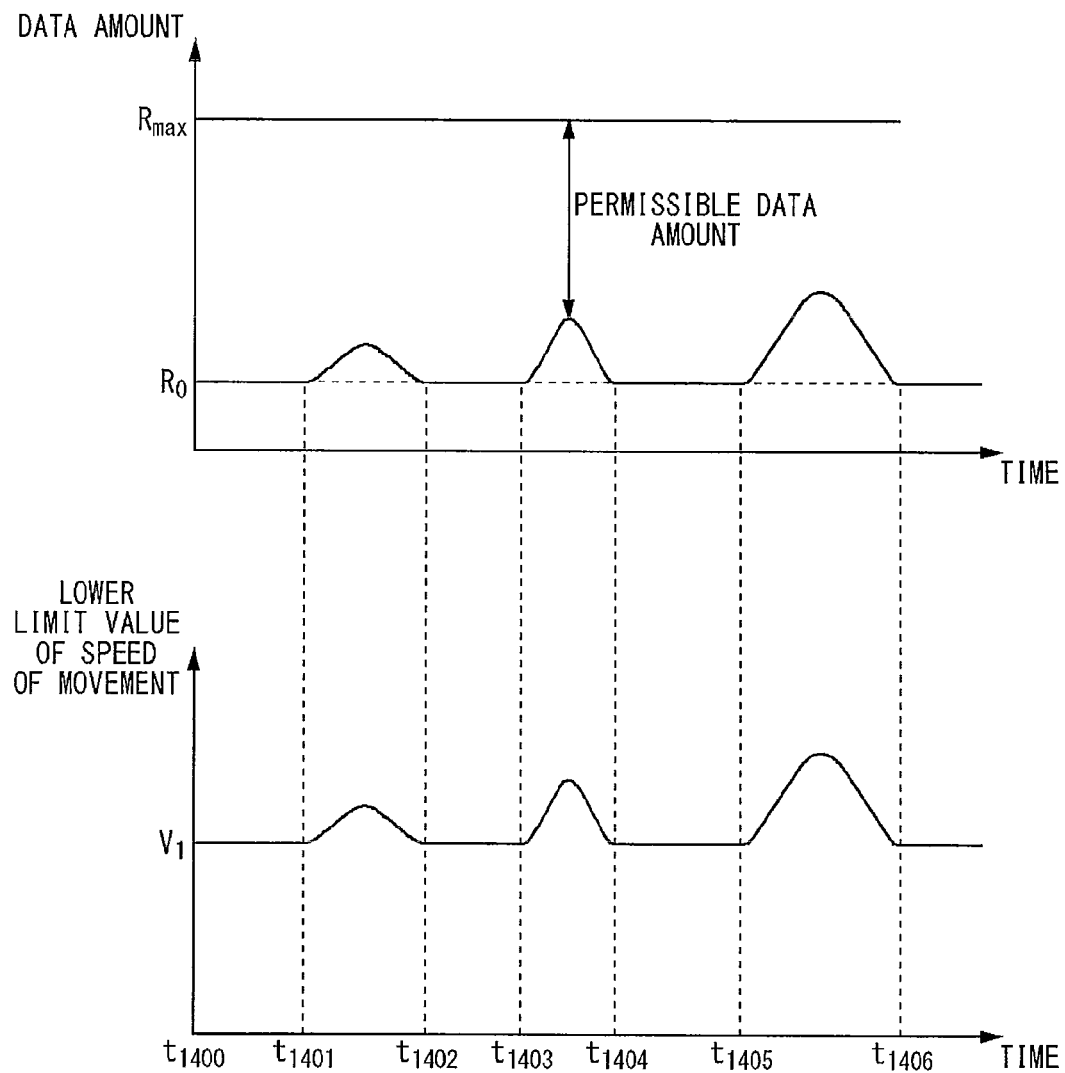
FIG. 14 illustrates, as an example, the variation over time in the lower limit value for a movement speed which is designated by a condition designating section 242.

FIG. 14 illustrates, as an example, the variation over time in the lower limit value for the speed of the movement which is designated by the condition designating section 242. The amount of moving image data transmitted via the transmission path 140 is substantially constant from the time t1400 to the time t1401, from the time t1402 to the time t1403, and from the time t1404 to the time t1405. During these periods, none of the image capturing apparatuses 100 detects a movement of a person. Therefore, all the image capturing apparatuses 100 convert the moving images captured into moving images of lower image quality and output the moving images of lower image quality, so that the total data amount of the moving images output from the image capturing apparatuses is R0.

On the other hand, from the time t1401 to the time t1402, from the time t1403 to the time t1404, and from the time t1405 to the time t1406, any one or more of the image capturing apparatuses 100 detect a movement of a person. Therefore, one or more of the image capturing apparatuses 100 output the captured moving images to the transmission path 140 without converting the captured moving images into moving images of lower image quality. This results in an increase in the amount of data transmitted per unit time via the transmission path 140. Here, the permissible data amount obtaining section 250 obtains, as the permissible data amount which is permitted to be transmitted per unit time, the difference between the maximum amount Rmax of data which can be transmitted per unit time via the transmission path 140 and the amount of data which is transmitted per unit time via the transmission path 140. Alternatively, the permissible data amount obtaining section 250 may obtain, as the permissible data amount, the resulting value of dividing the difference between the maximum amount Rmax of data which can be transmitted per unit time via the transmission path 140 and the amount of data which is transmitted per unit time via the transmission path 140, by the number of image capturing apparatuses 100 which output the moving images to the transmission path 140.

The condition designating section 242 causes the condition storing section 240 to store thereon a lower limit value for the speed of the movement which is inversely proportional to the permissible data amount which is obtained by the permissible data amount obtaining section 250. With such a configuration, the lower limit value for the speed of the movement which is stored on the condition storing section 240 increases as the permissible data amount decreases.

Here, a priority order may be determined in advance among the image capturing apparatuses 100. The condition designating section 242 may decrease the lower limit value for the speed of the movement which is stored on the condition storing section 240 as the priority of the image capturing apparatus 100 increases. The condition designating section 242 may store, onto the condition storing section 240, the lower limit value for the speed of the movement which is determined in accordance with the permissible data amount, at predetermined intervals and in accordance with a predetermined order.

According to the above description, the condition designating section 242 designates the lower limit value for the speed of the movement which is stored on the condition storing section 240 in accordance with the permissible data amount. Similarly, the condition designating section 242 can designate, in accordance with the permissible data amount, the lower limit values stored on the condition storing section 240 for the area occupied by the person, the area of the changed region, the area occupied by particular colors, the degree of match in terms of shape between the detected object and the reference object, and the degree of match between the reference direction and the movement direction.

Figure 15:
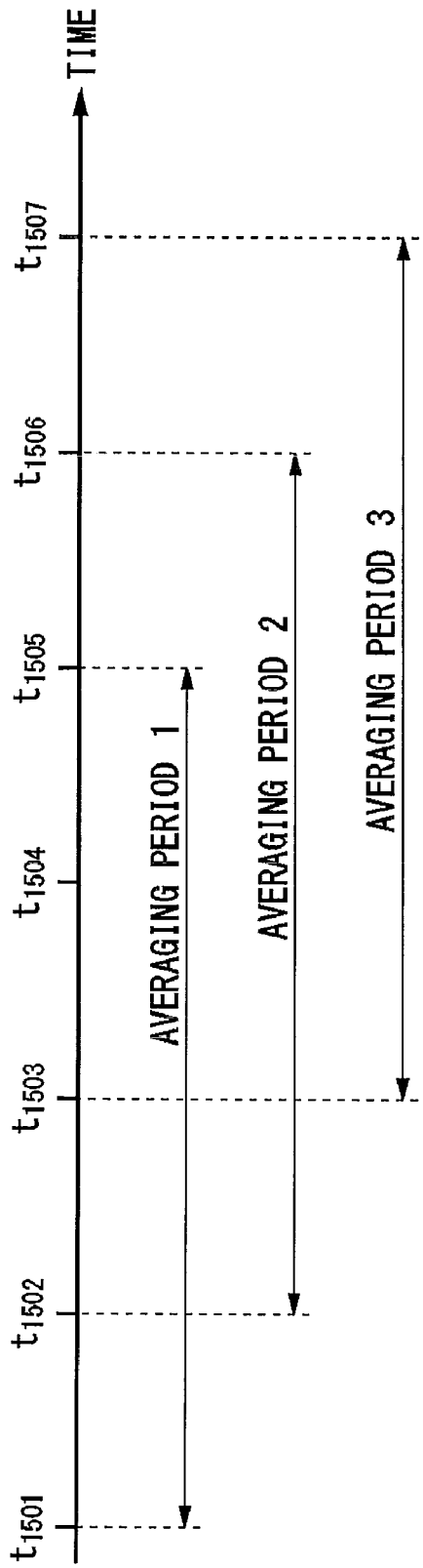
FIG. 15 illustrates, as an example, how averaging periods are defined.

FIG. 15 illustrates, as an example, how to define averaging periods during each of which moving-image making-up images averaged to generate a single averaged image are captured. According to the exemplary case shown in FIG. 9, each averaging period includes therein the timings at which successive four moving-image making-up images are captured, and the averaging periods do not overlap each other. As an alternative example, the averaging periods may overlap each other. As an example of the averaging periods of the latter type, FIG. 15 illustrates averaging periods each of which includes therein the timings at which successive five moving-image making-up images are captured, and the averaging periods overlap each other. Here, the start timing of each of the successive averaging periods shown in FIG. 15 is shifted from the start timing of an immediately preceding averaging period by a time equal to the image capturing interval at which the moving-image making-up images are captured. However, the difference in start timing between successive averaging periods is not limited to be equal to the image capturing interval.

As indicated by the above explanation, the averaged image generating section 202 generates averaged images by, so to say, successively averaging the moving-image making-up images. When the amount of a change between adjacent averaged images is smaller than a predetermined value, the output moving image generating section 282 may generate an output moving image which includes, as the output frame images, images obtained by reducing the resolution or the number of gray levels of the moving-image making-up images captured during the averaging periods. When the amount of a change between adjacent averaged images is smaller than a predetermined value, the output moving image generating section 282 may generate an output moving image which includes, as the output frame images, the images obtained by reducing the resolution or the number of gray levels of the moving-image making-up images which are captured at the timings corresponding to the middle of the respective averaging periods. When the amount of a change between adjacent averaged images is smaller than a predetermined value, the output moving image generating section 282 may generate an output moving image in which the display rate is lowered during at least part of the averaging periods.

Figure 16:
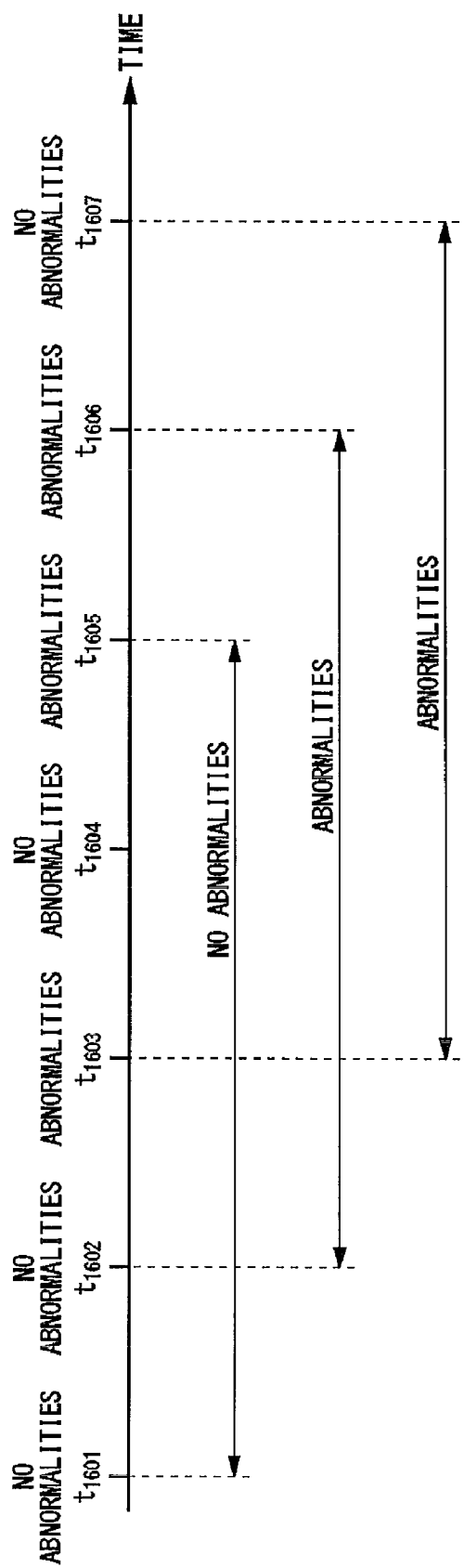
FIG. 16 illustrates another exemplary method to judge whether a condition is satisfied.

FIG. 16 illustrates another exemplary method to judge whether a condition is satisfied. According to the above description, the satisfaction judging section 230 judges whether a variation reduced image such as an averaged image satisfies a condition. As an alternative example, the satisfaction judging section 230 judges whether each moving-image making-up image shows abnormalities. When judging whether each moving-image making-up image satisfies a condition, the satisfaction judging section 230 can employ the same method as used to judge whether an averaged image satisfies a condition.

According to the exemplary case shown in FIG. 16, the satisfaction judging section 230 makes a judgment of "NO ABNORMALITIES" at the times t1601, t1602, t1604, and t1607, and makes a judgment of "ABNORMALITIES" at the times t1603, t1605, and t1606. When the satisfaction judging section 230 makes a judgment of "NO ABNORMALITIES", the moving-image making-up image does not satisfy the condition stored on the condition storing section 240. When the satisfaction judging section 230 makes a judgment of "ABNORMALITIES", the moving-image making-up image satisfies the condition stored on the condition storing section 240.

The satisfaction judging section 230 counts the number of judgments of "ABNORMALITES" and the number of judgments of "NO ABNORMALITIES", which are made for the moving-image making-up images captured during each averaging period. When the number of judgments of "ABNORMALTIES" is larger than the number of judgments of "NO ABNORMALITIES", the satisfaction judging section 230 judges that the condition is satisfied in the averaging period. According to the exemplary case shown in FIG. 16, the satisfaction judging section 230 makes the judgment of "NO ABNORMALITIES" (the condition is not satisfied) for the averaging period from the time t1601 to the time t1605, and makes the judgment of "ABNORMALITIES" (the condition is satisfied) for the averaging period from the time t1602 to the time t1606 and for the averaging period from the time t1603 to the time t1607.

According to the exemplary case shown in FIG. 16, the abnormalities are assessed by two values of "ABNORMALITIES" and "NO ABNORMALITIES". However; the satisfaction judging section 230 may calculate the degree of abnormalities for each moving-image making-up image. When the average value among the calculated degrees of abnormalities (or the median value among the degrees of abnormalities, the largest value among the degrees of abnormalities, or the total value of the degrees of abnormalities) is higher than a predetermined value, the satisfaction judging section 230 may judge that the condition is satisfied for the averaging period. Here, the degree of abnormalities can be, for example, the degree of satisfying a predetermined condition, or the number, area or the like of the objects satisfying a predetermined condition. In more detail, the degree of abnormalities may be the degree of match between an object contained in a moving-image making-up image and a predetermined pattern for a person, the degree of match between the direction in which an object contained in a moving-image making-up image moves and a predetermined direction, or the like. The above part describes, with reference to FIG. 16, the alternative operation of the satisfaction judging section 230 under the assumption that the averaging periods overlap each other, for example, as shown in FIG. 15. However, the satisfaction judging section 230 can judge whether the condition is satisfied in the manner described above, even when the averaging periods do not overlap each other as illustrated in FIG. 9.

Figure 17:
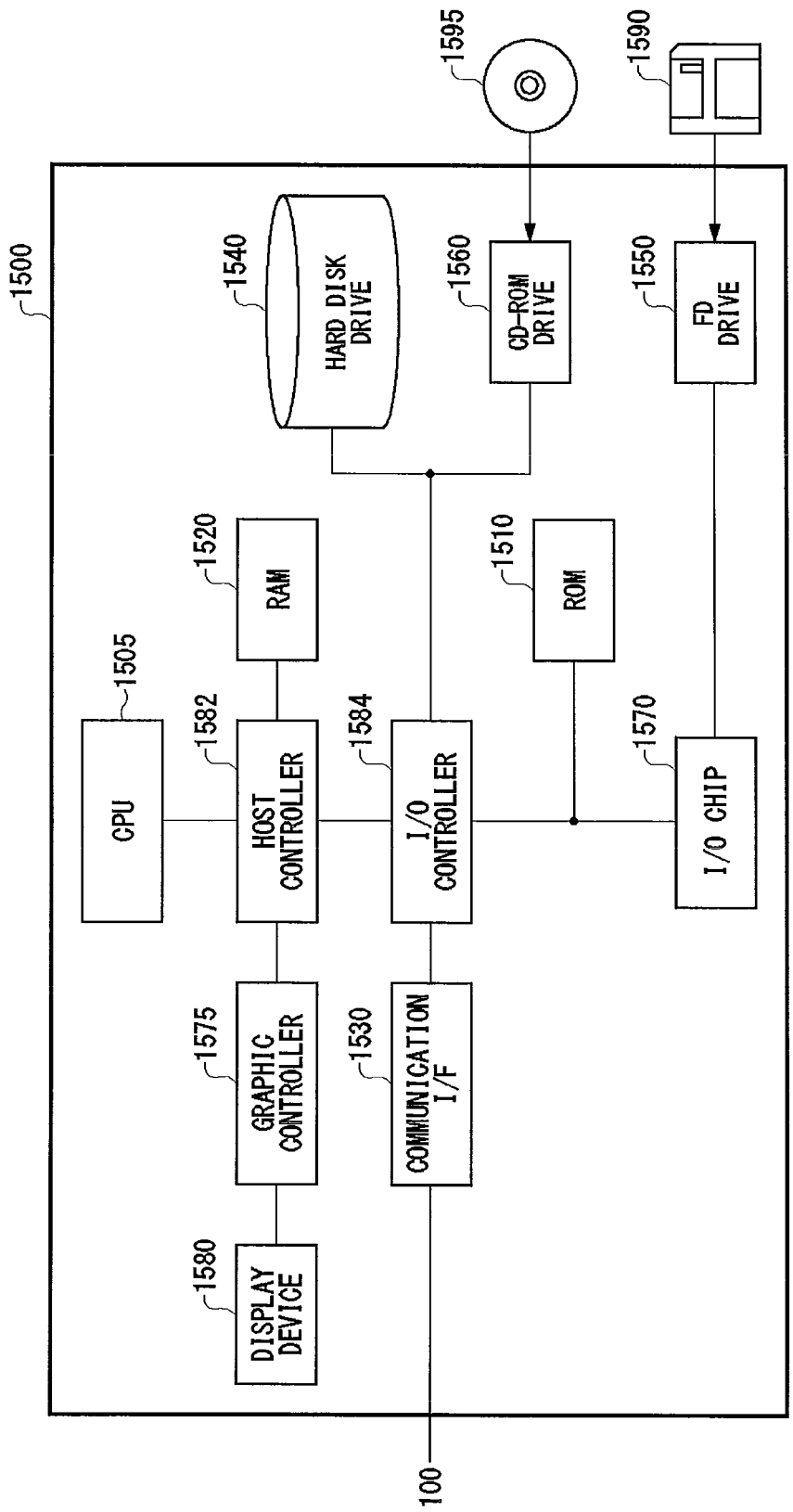
FIG. 17 illustrates an exemplary hardware configuration of a computer 1500 relating to the image capturing apparatus 100.

FIG. 17 illustrates an exemplary hardware configuration of a computer 1500 relating to the monitoring system 110. The computer 1500 is constituted by a CPU surrounding section, an input/output (I/O) section and a legacy I/O section. The CPU surrounding section includes a CPU 1505, a RAM 1520, a graphic controller 1575, and a display device 1580 which are connected to each other by means of a host controller 1582. The I/O section includes a communication interface 1530, a hard disk drive 1540, and a CD-ROM drive 1560 which are corrected to the host controller 1582 by means of an I/O controller 1584. The legacy I/O section includes a ROM 1510, a flexible disk drive 1550, and an I/O chip 1570 which are connected to the I/O controller 1584.

The host controller 1582 connects the RAM 1520 with the CPU 1505 and graphic controller 1575 which access the RAM 1520 at a high transfer rate. The CPU 1505 operates in accordance with programs stored on the ROM 1510 and RAM 1520, to control the constituents. The graphic controller 1575 obtains image data which is generated by the CPU 1505 or the like on a frame buffer provided within the RAM 1520, and causes the display device 1580 to display the obtained image data. Alternatively, the graphic controller 1575 may include therein a frame buffer for storing thereon image data generated by the CPU 1505 or the like.

The I/O controller 1584 connects, to the host controller 1582, the hard disk drive 1540, communication interface 1530 and CD-ROM drive 1560 which are I/O devices operating at a relatively high rate. The hard disk drive 1540 stores thereon programs and data to be used by the CPU 1505 provided in the computer 1500. The communication interface 1530 communicates with the image capturing apparatuses 100 via a network, to provide programs and data to the image capturing apparatuses 100. The CD-ROM drive 1560 reads programs or data from a CR-ROM 1595, and supplies the read programs or data to the hard disk drive 1540 and communication interface 1530 via the RAM 1520.

The I/O controller 1584 is also connected to the ROM 1510, flexible disk drive 1550 and/O chip 1570 which are I/O devices operating at a relatively low rate. The ROM 1510 stores thereon a boot program executed by the computer 1500 at the start up, programs unique to the hardware of the computer 1500, and the like. The flexible disk drive 1550 reads programs or data from a flexible disk 1590, and supplies the read programs or data to the hard disk drive 1540 and communication interface 1530 via the RAM 1520. The I/O chip 1570 is used to connect a variety of I/O devices such as the flexible disk drive 1550 via, for example, a parallel port, a serial port, a keyboard port a mouse port or the like.

A program to be supplied to the communication interface 1530 via the RAM 1520 is provided by a user in a state of being stored on a recording medium such as the flexible disk 1590, CD-ROM 1595 and an IC card. The program is read from the recording medium, provided to the communication interface 1530 via the RAM 1520, and transmitted to the image capturing apparatuses 100 via the network. The program transmitted to the image capturing apparatuses 100 is installed in and executed by the image capturing apparatuses 100.

The program to be installed in and then executed by the image capturing apparatuses 100 causes each of the image capturing apparatuses 100 to function as the image capturing section 200, variation reduced image generating section 201, image capturing control section 210, object region identifying section 212, image storing section 214, differential image generating section 216, change amount calculating section 221, movement amount calculating section 222, moving direction identifying section 223, particular color area calculating section 224, object extracting section 225, satisfaction judging section 230, match calculating section 232, condition storing section 240, condition designating section 242, permissible data amount obtaining section 250, image quality selecting section 260, image quality storing section 262, output control section 270, image generating section 280, output moving image generating section 282, and output section 290 described with reference to FIGS. 1 to 16.

The program mentioned above may be stored on an external recording medium. The recording medium is, for example, an optical recording medium such as DVD and PD, a magnet-optical recording medium such as MD, a tape medium, a semiconductor memory such as an IC card and the like, in addition to the flexible disk 1590 and CD-ROM 1595. The recording medium may be a storage device such as a hard disk and RAM which is provided in a server system connected to a dedicated communication network or the Internet, and the program may be provided to the computer 1500 via the network.

While the embodiment of the present invention has been described, the technical scope of the invention is not limited to the above described embodiment. It is apparent to persons skilled in the art that various alternations and improvements can be added to the above-described embodiment. It is also apparent from the scope of the claims that the embodiments added with such alternations or improvements can be included in the technical scope of the invention.

What is claimed is:

1. A monitoring system comprising:
   an image capturing section that captures a moving image of a monitored area;
   a variation reduced image generating section that generates a variation reduced image by reducing a temporal variation in an image, based on a plurality of moving-image making-up images included in the moving image captured by the image capturing section;
   a satisfaction judging section that judges whether the variation reduced image generated by the variation reduced image generating section satisfies a predetermined condition;
   an output moving image generating section that, when the satisfaction judging section judges negatively, generates an output moving image which has a lower image quality than when the satisfaction judging section judges positively, based on the moving image captured by the image capturing section; and
   an output section that outputs the output moving image generated by the output moving image generating section,
   wherein when the satisfaction judging section judges negatively, the output moving image generating section generates an output moving image including the variation reduced image generated by the variation reduced image generating section, and
   when the satisfaction judging section judges positively, the output moving image generating section uses the moving image captured by the image capturing section as an output moving image.

2. The monitoring system as set forth in claim 1, further comprising
   a condition storing section that stores thereon the condition which is required to be satisfied by a variation reduced image which is generated by using a plurality of moving-image making-up images included in a moving image which is judged to show an abnormality, wherein
   the satisfaction judging section judges whether the variation reduced image satisfies the condition stored in the condition storing section.

3. The monitoring system as set forth in claim 2, further comprising
   a change amount calculating section that calculates an amount of a change, from a reference image, which is detected in the variation reduced image generated by the variation reduced image generating section, wherein
   the condition storing section stores thereon a lower limit value for an amount of a change, from a reference image, which is required to be detected in the variation reduced image generated by using the plurality of moving-image making-up images included in the moving image which is judged to show an abnormality, and
   when the amount of the change which is calculated by the change amount calculating section is equal to or higher than the lower limit value for the amount of the change which is stored on the condition storing section, the satisfaction judging section judges positively.

4. The monitoring system as set forth in claim 2, further comprising
   an object extracting section that extracts an object from the variation reduced image generated by the variation reduced image generating section, wherein
   the condition storing section stores thereon a lower limit value for a degree of match which is required to be detected between a predetermined object and an object contained in the variation reduced image generated by using the plurality of moving-image making-up images included in the moving image which is judged to show an abnormality, and
   when a degree of match between the object extracted by the object extracting section and the predetermined object is equal to or higher than the lower limit value which is stored on the condition storing section, the satisfaction judging section judges positively.

5. The monitoring system as set forth in claim 2, further comprising
   a particular color area calculating section that calculates an area occupied by a color included in a predetermined color range in the variation reduced image generated by the variation reduced image generating section, wherein
   the condition storing section stores thereon a lower limit value for an area occupied by the color included in the predetermined color range which is required to be detected in the variation reduced image generated by using the plurality of moving-image making-up images included in the moving image which is judged to show an abnormality, and
   when the area calculated by the particular color area calculating section is equal to or higher than the lower limit value for the area which is stored on the condition storing section, the satisfaction judging section judges positively.

6. The monitoring system as set forth in claim 2, further comprising
   a moving direction identifying section that identifies a moving direction of a subject in the monitored area, based on what is shown by a plurality of variation reduced images generated by the variation reduced image generating section, wherein
   the condition storing section stores thereon a lower limit value for a degree of match which is required to be detected in the variation reduced image generated by using the plurality of moving-image making-up images included in the moving image which is judged to show an abnormality, between a direction from a position of a subject contained in the variation reduced image to the image capturing section and a moving direction of the subject, and
   when a degree of match between the moving direction of the subject and a direction from a position of the subject to the image capturing section is equal to or higher than the lower limit value for the degree of match which is stored on the condition storing section, the satisfaction judging section judges positively.

7. The monitoring system as set forth in claim 3, wherein
   the satisfaction judging section judges whether each of partial regions in the variation reduced image satisfies the condition, and
   the output moving image generating section generates an output moving image in which an image quality is lower in a region different from a satisfying region which is judged by the satisfaction judging section to satisfy the condition than in the satisfying region.

8. The monitoring system as set forth in claim 3, wherein
   the variation reduced image generating section generates the variation reduced image by using a predetermined number of moving-image making-up images included in the moving image captured by the image capturing section, and
   when the satisfaction judging section judges negatively, the output moving image generating section generates, by using the moving image captured by the image capturing section, an output moving image which has a lower image quality in at least part of a period during which the predetermined number of moving-image making-up images are captured, than when the satisfaction judging section judges positively.

9. The monitoring system as set forth in claim 1, wherein when the satisfaction judging section judges negatively, the output moving image generating section generates, by using moving-image making-up images included in the moving image captured by the image capturing section, an output moving image which includes moving-image making-up images having a lower image quality than when the satisfaction judging section judges positively.

10. The monitoring system as set forth in claim 9, wherein when the satisfaction judging section judges negatively, the output moving image generating section generates an output moving image which includes moving-image making-up images having a lower resolution than when the satisfaction judging section judges positively.

11. The monitoring system as set forth in claim 9, wherein when the satisfaction judging section judges negatively, the output moving image generating section generates an output moving image which includes moving-image making-up images expressed by using a smaller number of gray levels than when the satisfaction judging section judges positively.

12. The monitoring system as set forth in claim 1, wherein the variation reduced image generating section generates the variation reduced image by averaging a plurality of moving-image making-up images included in the moving image captured by the image capturing section.

13. The monitoring system as set forth in claim 1, further comprising
a differential image generating section that generates a differential image between a first variation reduced image and a second variation reduced image which are both generated by the variation reduced image generating section, the second variation reduced image being generated by using moving-image making-up images captured after any of moving-image making-up images used to generate the first variation reduced image, wherein
when the satisfaction judging section judges negatively, the output moving image generating section generates an output moving image including a differential image generated by the differential image generating section, and
when the satisfaction judging section judges positively, the output moving image generating section uses the moving image captured by the image capturing section as an output moving image.

14. The monitoring system as set forth in claim 13, further comprising
a permissible data amount obtaining section that obtains an amount of data which is permitted to be output per unit time from the output section, wherein
when the satisfaction judging section judges negatively, the output moving image generating section generates the output moving image including the differential image generated by the differential image generating section under a condition that the data amount which is obtained by the permissible data amount obtaining section is smaller than a predetermined value.

15. The monitoring system as set forth in claim 1, wherein when the satisfaction judging section judges negatively, the output moving image generating section generates, by using the moving image captured by the image capturing section, the output moving image which has a lower display rate than when the satisfaction judging section judges positively.

16. The monitoring system as set forth in claim 15, wherein the variation reduced image generating section generates a variation reduced image at an interval equal to a predetermined time duration by using a plurality of moving-image making-up images included in a moving image captured by the image capturing section during a time period having the predetermined time duration,
when the satisfaction judging section judges that a first variation reduced image which is generated by the variation reduced image generating section by using a plurality of moving-image making-up images included in a moving image captured by the image capturing section during a first period does not satisfy the condition, the output moving image generating section uses the first variation reduced image as a moving-image making-up image of an output moving image corresponding to the first period, and
when the satisfaction judging section judges that the first variation reduced image satisfies the condition, the output moving image generating section uses the moving image captured by the image capturing section during the first period as the output moving image corresponding to the first period.

17. The monitoring system as set forth in claim 15, wherein the variation reduced image generating section generates a variation reduced image at an interval equal to a predetermined time duration by using a plurality of moving-image making-up images included in a moving image captured by the image capturing section during a time period having the predetermined time duration,
when the satisfaction judging section judges that a first variation reduced image which is generated by the variation reduced image generating section by using a plurality of moving-image making-up images included in a moving image captured by the image capturing section during a first period does not satisfy the condition, the output moving image generating section uses a variation reduced image generated by the variation reduced image generating section by using a plurality of moving-image making-up images captured by the image capturing section during a second period which follows the first period as a moving-image making-up image of an output moving image corresponding to the second period, and
when the satisfaction judging section judges that the first variation reduced image satisfies the condition, the output moving image generating section uses a moving image captured by the image capturing section during the second period as an output moving image corresponding to the second period.

18. The monitoring system as set forth in claim 15, further comprising
a permissible data amount obtaining section that obtains an amount of data which is permitted to be output per unit time from the output section, wherein
the variation reduced image generating section determines a time duration during which a plurality of moving-image making-up images used to generate a single variation reduced image are captured in such a manner that a display rate for a moving image made up by a plurality of variation reduced images is lower than a display rate for a moving image which is capable of being transmitted at a rate equal to the data amount obtained by the permissible data amount obtaining section, and the variation reduced image generating section averages a plurality of moving-image making-up images included in a moving image captured by the image capturing section during a time period having the determined time duration, so as to generate a variation reduced image at an interval equal to the determined time duration.

19. A monitoring method comprising:

capturing a moving image of a monitored area;

generating a variation reduced image by reducing a temporal variation in an image, based on a plurality of moving-image making-up images included in the moving image captured in the image capturing;

judging whether the variation reduced image generated in the variation reduced image generating satisfies a predetermined condition;

when the variation reduced image is judged not to satisfy the condition in the judging, generating an output moving image which has a lower image quality than when the variation reduced image is judged to satisfy the condition in the judging, based on the moving image captured in the image capturing; and outputting the output moving image generated in the output moving image generating, wherein when the satisfaction judging section judges negatively, the output moving image generating section generates an output moving image including the variation reduced image generated by the variation reduced image generating section, and when the satisfaction judging section judges positively, the output moving image generating section uses the moving image captured by the image capturing section as an output moving image.

20. A non-transitory computer readable medium storing therein a program for a monitoring system, the program causing a computer to function as:

an image capturing section that captures a moving image of a monitored area;

a variation reduced image generating section that generates a variation reduced image by reducing a temporal variation in an image, based on a plurality of moving-image making-up images included in the moving image captured by the image capturing section;

a satisfaction judging section that judges whether the variation reduced image generated by the variation reduced image generating section satisfies a predetermined condition;

an output moving image generating section that, when the satisfaction judging section judges negatively, generates an output moving image which has a lower image quality than when the satisfaction judging section judges positively, based on the moving image captured by the image capturing section; and an output section that outputs the output moving image generated by the output moving image generating section, wherein when the satisfaction judging section judges negatively, the output moving image generating section generates an output moving image including the variation reduced image generated by the variation reduced image generating section, and when the satisfaction judging section judges positively, the output moving image generating section uses the moving image captured by the image capturing section as an output moving image.

* * * * *